US012345542B2

(12) United States Patent
Pietryka et al.

(10) Patent No.: US 12,345,542 B2
(45) Date of Patent: Jul. 1, 2025

(54) CONTEXT SENSITIVE USER INTERFACE FOR ENHANCED VEHICLE OPERATION

(71) Applicant: Tesla, Inc., Austin, TX (US)

(72) Inventors: Pawel Pietryka, Los Angeles, CA (US); Jean Helfenstein, Marina Del Rey, CA (US)

(73) Assignee: Tesla, Inc., Austin, TX (US)

( * ) Notice: Subject to any disclaimer, the term of this patent is extended or adjusted under 35 U.S.C. 154(b) by 847 days.

(21) Appl. No.: 16/949,932

(22) Filed: Nov. 20, 2020

(65) Prior Publication Data

US 2021/0156705 A1 May 27, 2021

Related U.S. Application Data

(60) Provisional application No. 62/938,842, filed on Nov. 21, 2019, provisional application No. 62/938,769, filed on Nov. 21, 2019.

(51) Int. Cl.
*G01C 21/36* (2006.01)
*B60K 35/00* (2024.01)
(Continued)

(52) U.S. Cl.
CPC ............ *G01C 21/367* (2013.01); *B60K 35/00* (2013.01); *G01C 21/3664* (2013.01);
(Continued)

(58) Field of Classification Search
USPC ........................................................ 701/455
See application file for complete search history.

(56) References Cited

U.S. PATENT DOCUMENTS 6,529,822 B1 * 3/2003 Millington ......... G01C 21/3632
701/457
9,109,921 B1 * 8/2015 Furio ................. G01C 21/3664
(Continued)

FOREIGN PATENT DOCUMENTS

CN 102742265 10/2012
CN 102999255 3/2013
(Continued)

OTHER PUBLICATIONS

International Search Report and Written Opinion dated May 4, 2021 in patent application No. PCT/US2020/061543.

*Primary Examiner* — William L Bashore
*Assistant Examiner* — Conrad R Pack
(74) *Attorney, Agent, or Firm* — Knobbe, Martens, Olson & Bear, LLP

(57) ABSTRACT

Systems and methods for context sensitive user interfaces for enhanced vehicle operation. An example method is method implemented by a system of one or more processors, the system being included in a vehicle. The method includes causing presentation, via a display of the vehicle, of a unified user interface comprising a combined view which aggregates an autonomous visualization and map information, the autonomous visualization and map information being related to a zoom level, with the unified user interface being generated based on first contextual information indicative of operation of the vehicle. Second contextual information indicative of subsequent operation of the vehicle is accessed. The unified user interface is updated based on the second contextual information, with the combined view being adjusted, and with adjusting the combined view including adjusting a size of the combined view in the unified user interface or adjusting the zoom level.

14 Claims, 33 Drawing Sheets

(51) Int. Cl.
  *B60K 35/10* (2024.01)
  *B60K 35/28* (2024.01)
  *B60K 35/29* (2024.01)
  *G06V 20/59* (2022.01)
  *G06V 40/10* (2022.01)

(52) U.S. Cl.
  CPC .......... G06V 20/593 (2022.01); G06V 40/103 (2022.01); *B60K 35/10* (2024.01); *B60K 35/28* (2024.01); *B60K 35/29* (2024.01); *B60K 2360/111* (2024.01); *B60K 2360/115* (2024.01); *B60K 2360/119* (2024.01); *B60K 2360/165* (2024.01); *B60K 2360/166* (2024.01); *B60K 2360/179* (2024.01); *B60K 2360/1868* (2024.01)

(56) References Cited

U.S. PATENT DOCUMENTS

| | | |
|---|---|---|
| 10,464,397 B2 | 11/2019 | Castiglioni et al. |
| 2002/0126876 A1 | 9/2002 | Paul et al. |
| 2004/0243307 A1 | 12/2004 | Geelen |
| 2013/0103313 A1* | 4/2013 | Moore ............... G01C 21/3673 701/533 |
| 2013/0229522 A1 | 9/2013 | Schofield |
| 2015/0241240 A1* | 8/2015 | Yamada ............... G01C 21/367 701/410 |
| 2015/0369623 A1* | 12/2015 | Blumenberg .......... G09G 5/377 701/532 |
| 2016/0178383 A1* | 6/2016 | Mays ................. G01C 21/3682 701/408 |
| 2017/0111587 A1* | 4/2017 | Herbst .................. G08G 1/167 |
| 2017/0217368 A1 | 8/2017 | Lewis et al. |
| 2017/0356755 A1* | 12/2017 | Strawn ................ G08G 1/0969 |
| 2019/0094040 A1* | 3/2019 | Lewis .................... B60Q 9/008 |
| 2019/0212162 A1* | 7/2019 | Sata ................... G01C 21/3691 |
| 2019/0351918 A1* | 11/2019 | Maeng ................. H04W 4/023 |
| 2020/0217687 A1* | 7/2020 | Camhi ............... G01C 21/3608 |

FOREIGN PATENT DOCUMENTS

| | | |
|---|---|---|
| CN | 108349423 | 7/2018 |
| DE | 102010062464 | 6/2012 |
| DE | 102018203462 | 12/2019 |
| EP | 1 548 404 | 6/2005 |
| JP | 2014-178942 | 9/2014 |

\* cited by examiner

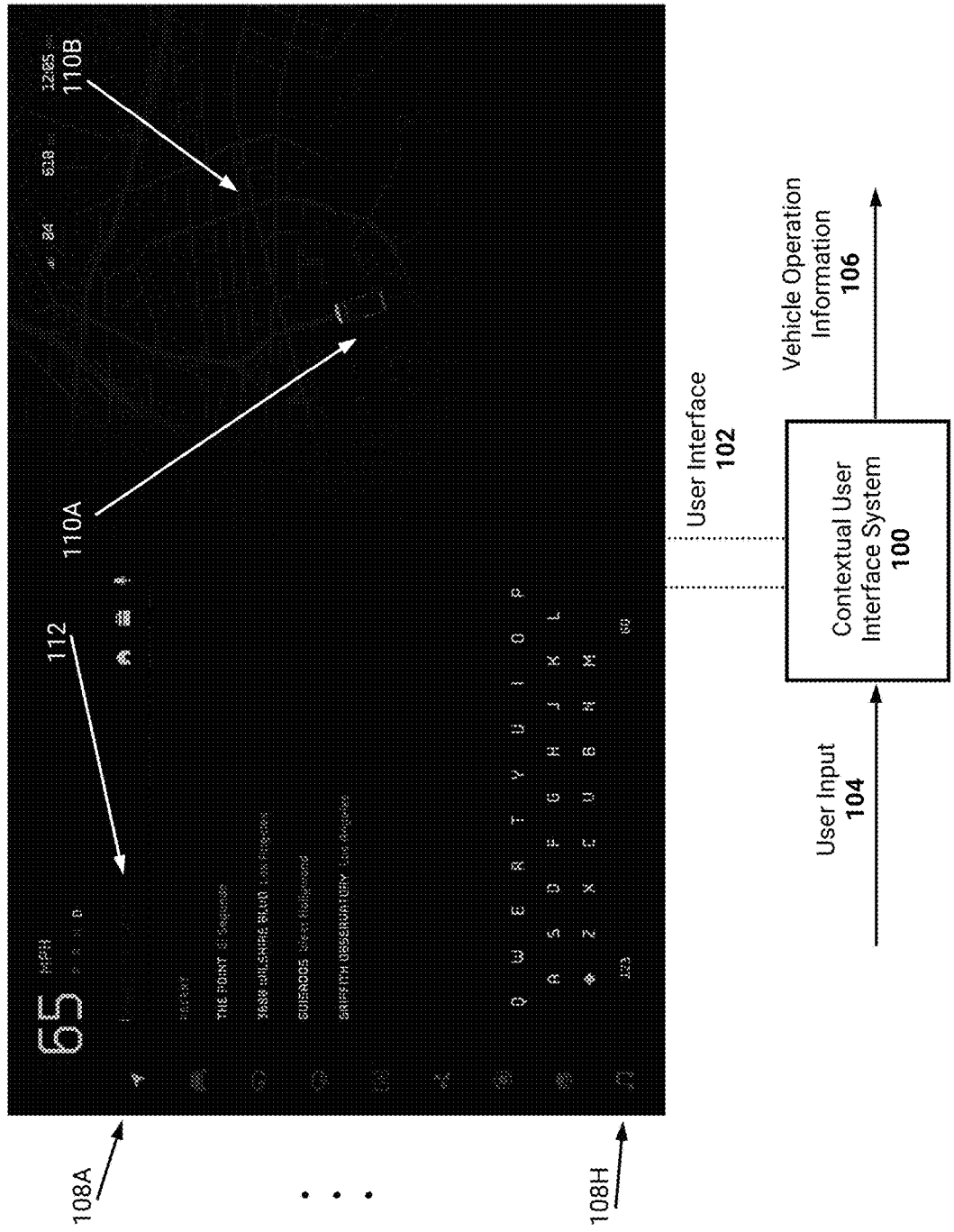

1

CONTEXT SENSITIVE USER INTERFACE FOR ENHANCED VEHICLE OPERATION

CROSS-REFERENCE TO PRIOR APPLICATIONS

This application claims priority to U.S. Prov. App. No. 62/938,842 titled "CONTEXT SENSITIVE USER INTERFACE FOR ENHANCED VEHICLE OPERATION" and filed on Nov. 21, 2019, and U.S. Prov. App. No. 62/938,769 titled "ENHANCED VEHICLE FUNCTIONALITY VIA PASSENGER RECOGNITION" and filed on Nov. 21, 2019, the disclosures of which are hereby incorporated herein by reference in their entirety.

BACKGROUND

Field

The present disclosure relates to user interfaces and, more particularly, to user interfaces for vehicle operation.

Description of the Related Art

Displays used to present digital user interfaces are increasingly being included in vehicles for control and/or operation of the vehicles. For example, a display may be included in a vehicle dashboard of a vehicle. In this example, the display may present a user interface including a current speed of the vehicle, a total distance traveled by the vehicle, a temperature outside of the vehicle, and so on. As another example, a display may be included in a central portion of the vehicle. This display may be used to present navigation information, control air conditioning, and so on. Such digital user interfaces may thus be used in place of mechanical displays, buttons, knobs, and so on.

However, as digital user interfaces are expanded to encompass more control and/or operation of a vehicle, the digital user interfaces are increasing in complexity. For certain digital user interfaces, this complexity reduces an ease of use associated with the user interfaces. Thus, a user experience associated with operation of a vehicle may be reduced. As an example, certain functionality may be hidden among varying levels of menus. As another example, a user may be required to memorize complex user input sequences to traverse a digital user interface. Being able to provide an intuitive digital user interface may therefore enhance a user's enjoyment in operating a vehicle.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1A illustrates a block diagram of an example contextual user interface system presenting a user interface.

DETAILED DESCRIPTION

Figure 1B:
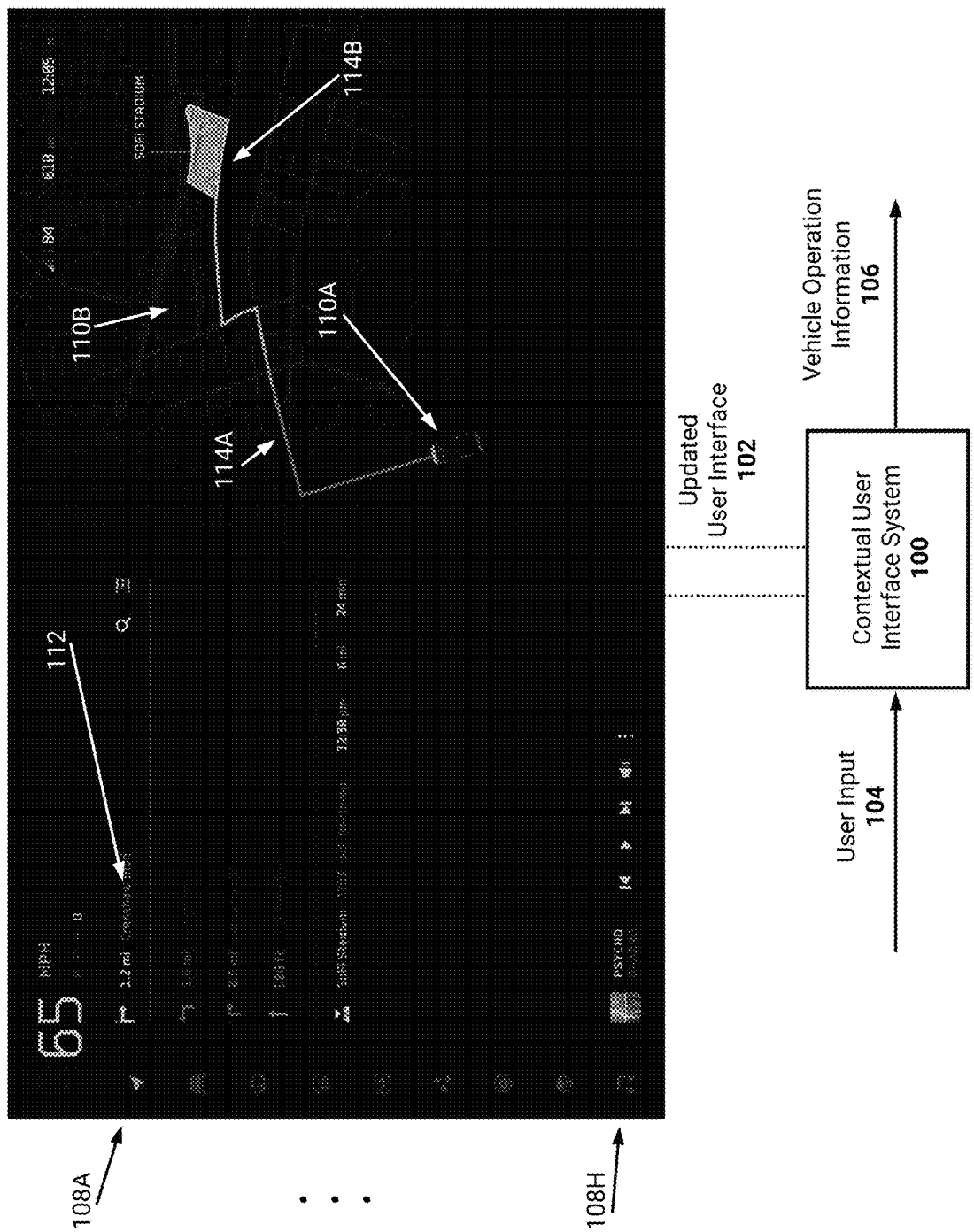
FIG. 1B illustrates a block diagram of the example contextual user interface system presenting an updated user interface based on received user input.

This specification describes, with respect to some embodiments, enhanced user interfaces usable to control and/or operate a vehicle. The user interfaces described herein may be examples of digital user interfaces rendered by a processor or system and presented via a display positioned within the vehicle. In some embodiments, the display may be included in a central portion of the vehicle. For example, the display may be greater than a certain diagonal size (e.g., 10 inches, 13 inches, 15 inches, 17 inches, 21 inches, and so on). Since the display, in some embodiments, may be positioned centrally and be greater than the certain diagonal size, the display may provide a centralized interface at which control and/or operation of the vehicle occurs. Thus, ensuring that the centralized interface is easy to understand and utilize may enhance usability of the vehicle. As will be described, the enhanced user interfaces dynamically unify (e.g., aggregate) an autonomous visualization (e.g., visualizations generated from sensors about the vehicle), map information, navigation information, and/or vehicle functionality controls.

One embodiment of the invention is a vehicle having a user interface (referred to herein as a unified user interface) that may dynamically update based on contextual information which relates to operation of a vehicle. For example, contextual information may indicate that the vehicle is in park or is being driven. As another example, contextual information may indicate that the vehicle is navigating towards a destination and/or is being autonomously or semi-autonomously controlled. As another example, contextual information may indicate that the vehicle is towing a trailer, being driven off-road, and so on. As another example, contextual information may relate to control of vehicle functionality. The unified user interface, as will be described, includes easy-to understand interactive elements which are responsive to the current contextual information.

With respect to the vehicle being in park, the unified user interface may present an autonomous visualization including a graphical depiction of the vehicle that can be selected using a touch-screen interface. Vehicle controls may be included on the graphical depiction, such that an end-user can open a trunk, open/close windows, disconnect or connect a trailer, and so on. In some embodiments, the autonomous visualization may include a graphical representation of a real-world environment in which the vehicle is located. With respect to the vehicle being autonomously or semi-autonomously controlled, the unified user interface may present an autonomous visualization overlaid onto map information. For example, autonomous visualization may include representations of a surface on which the vehicle is driving. In this example, the graphical depiction of the vehicle may be illustrated in a particular lane of a road along with graphical representations of other vehicles or objects which are proximate to the vehicle. As an example, representations of lane lines, off-ramps or on-ramps, pedestrians, hazards, signs, or other objects may be included. The map information may include a graphical representation of a portion of a map in which the vehicle is being driven. For example, the map information may inform a number of lane lines on a current road, other roads proximate to the current road, or other map-based information. For example, roads may be represented along with identifiers of the roads.

With respect to the vehicle being navigated towards a destination, the unified user interface may include an autonomous visualization, map information, and navigation information. As will be described, the unified user interface may graphically depict navigation events (e.g., upcoming turns, off-ramps, on-ramps, and so on) identified in navigation information. For example, the unified user interface may graphically depict that the vehicle is to move from a current lane to a different lane. Furthermore, the unified user interface may cause the presented information to zoom in or zoom out depending on contextual information. For example, a zoom level may be set which causes an adjustment of a size of the autonomous visualization, map information, and navigation information.

As an example, as the vehicle exits a highway off-ramp the presented information may zoom out. In this example, the autonomous visualization (e.g., the graphical depiction of the vehicle) may become smaller with the portion of map information representing a larger real-world geographic area (e.g., more roads may be depicted) becoming relatively larger. Upcoming navigation events, such as a navigation route, may similarly be zoomed out such that a larger portion of the route is shown. In this way, the end-user may be presented with upcoming turns on surface roads. After the user exits the off-ramp and drives on a surface road, the presented information may optionally zoom in.

Additional contextual information may relate to control of vehicle functionality, such as playing music, adjusting air conditioning, streaming video, overlaying video obtained from one or more cameras, and so on. As may be appreciated, control of such vehicle functionality may consume varying portions of the user interface. For example, to adjust an air conditioning setting the user interface may present air conditioning controls. As will be described, the unified user interface may ensure that the autonomous visualization, map information, and/or navigation information, remains unobstructed from view. For example, an end-user may select a user interface element to control an air conditioning setting while navigating towards a destination. In this example, the unified user interface may adjust presentation of the autonomous visualization, map information, and/or navigation information and include the air conditioning controls, or an overlay of the air conditioning controls over the navigation display. An example technique to adjust the presentation of information to the passenger may include moving the autonomous visualization, map information, and/or navigation information to a different portion of the unified user interface (e.g., further from the end-user). Another example technique is to overlay certain controls on top of the map or navigation information.

Contextual information may therefore relate to operation of the vehicle. Example contextual information is described herein however it is to be appreciated that other information may be used and fall within the scope of the disclosure. For example, contextual information may indicate that the vehicle is navigation to a location. In this example, contextual information may reflect a location of the vehicle with respect to the location. As an example, the location m ay indicate upcoming, or prior, driving events (e.g., turns, lane changes, and so on). Thus, as the vehicle is navigating to the location the contextual information may be updated based on the location. In this way, and as will be described, the user interface may update based on the location (e.g., a presented map may zoom out, and so on).

While the description above focused on a user interface being presented on a display, in some embodiments multiple displays may be used. For example, a first display may be positioned proximate or in front of a driver of a vehicle. In this example, a second display may be positioned in a central portion of the vehicle or in a position further from the driver. As an example, the vehicle may represent a semi-truck with two or more displays.

At the outset, an example user interface is described. This example user interface may provide for centralized control of a vehicle. However, this example user interface may occlude important information, such as a map depicting a location of a vehicle and/or navigation information, during routine use of the user interface. As will be described, the unified user interface may improve upon this example user interface. It should be realized that the selection of controls or other information on the user interface may be through a touch interface or other well-known user interface mechanism.

Example User Interface

An example user interface for centralized control of a vehicle may be separated into a first portion and a second portion. The first portion, for example, may include a graphical depiction of the vehicle which the user interface may update in substantially real-time based on operation of the vehicle. For example, if the vehicle is braking, the graphical depiction may update to depict brake lights. As another example, if the vehicle has its front lights turned on, emergency flashers, and so on, then the graphical depiction may update accordingly. The second portion may include a graphical representation of a map. For example, the map may include an icon, such as an arrow, indicating a location of the vehicle on the map. In this example, as the vehicle is being driven the icon may be updated to reflect a substantially real-time position of the vehicle.

The first portion may therefore provide a succinct view of real-time conditions associated with operation of the vehicle. The user interface may, as an example, indicate lane markings in this first portion. Thus, a user may quickly view whether they are following the lane markings properly. Additionally, the vehicle may allow for autonomous operation. Thus, the user may view the first portion to ensure that the vehicle is properly recognizing lane markings when in an autonomous mode.

The second portion may be relied upon to present regional conditions associated with operating the vehicle. For example, the second portion may depict traffic conditions with respect to roads included in a map. In this example, the user may thus quickly ascertain whether a highway or freeway has any accidents, is traffic heavy, and so on. The second portion may additionally present navigation information. For example, a route to a particular ending location may be presented on the map along with an indication of a next turn to make. In this way, the user may quickly identify how to reach the ending location.

This example user interface may additionally include the display of a multitude of icons or other graphical indicia associated with disparate vehicle functionality which is controllable via the user interface. Example vehicle functionality may include air conditioning, music, monitoring energy usage of an electric vehicle, driving control, self-driving control, and so on. To adjust vehicle functionality, such as adjusting an air conditioning setting, a user may select an icon. As an example, the user interface may be presented via a touch-screen display. In this example, a user may touch a portion of the display depicting the icon. As another example, the user interface may be responsive to verbal commands. In this example, the user may provide a verbal command indicative of the type of vehicle functionality (e.g., 'set air conditioning').

Upon user-selection of an icon, a menu, or other user interface, associated with the type of vehicle functionality may be presented. Since the user interface is separated into two portions, the presented menu may be overlaid on top of at least one of the portions. For example, if a user selects an icon associated with music, the user interface may update to a music selection menu. It may be appreciated that the menu may occlude at least one of the two portions. As an example, the menu may be overlaid onto the map. Thus, at least a portion of the map may be occluded via this music menu. A user may be required to remove the menu to view an entirety of the map. For example, the user may swipe the menu in a downward motion.

Therefore, during routine operation of the example user interface, controlling vehicle functionality may cause information included in the first portion and/or the second portion to be masked. This may be disadvantageous during navigation of the vehicle. As an example, the second portion may indicate a route to be followed on a presented map. If the user prefers to select updated air conditioning settings, adjust music, view energy tracking information, and so on, at least a portion of the indicated route may become hidden.

Unified User Interface

As will be described, a system or processor rendering the unified user interface may combine an autonomous visualization (e.g., a graphical depiction of a vehicle) and map information. This combination may be referred to herein as a combined view and may be presented such that a user has a consistent view of, at least, the autonomous visualization and map information. The view may advantageously not be occluded by menus or user interfaces associated with types of vehicle functionality. As will be described, menus for vehicle functionality may optionally be dynamically presented separate from that of the combined autonomous visualization and map information.

Additionally, the system or processor may dynamically update the combined view according to upcoming driving events. For example, the system may adjust a zoom level associated with the combined view. In this example, the zoom level may be indicative of a render or virtual camera associated with the combined view. As an example, a higher zoom level may represent the render or virtual camera encompassing a greater area of map information. Thus, a size of the autonomous visualization may decrease accordingly.

Unified User Interface—Combined Autonomous Visualization and Map Information

In some embodiments, a system or processor may update the unified user interface according to current contextual information associated with operation of a vehicle. For example, if the vehicle is in park, the unified user interface may depict a large graphical depiction of the vehicle. Thus, the graphical depiction may substantially fill the unified user interface. This graphical depiction may include interactive options associated with control of the vehicle. For example, the vehicle may be an electric truck, and the options may include adjustment of suspension, opening/closing of a charging port, opening/closing of a tonneau cover, opening/closing of a tail gate, and so on. If the user selects adjustment of suspension, the unified user interface may update to reflect different suspension levels which may be selected.

This large graphical depiction of the vehicle described above may be included in a zoomed-in view of a map. For example, the unified user interface may optionally reflect environmental information proximate to the vehicle. The graphical depiction may optionally reflect a third-person view of the vehicle, such as reflecting a virtual or render camera positioned at an upward rear of the vehicle. In some embodiments, the graphical depiction may be presented in a street view of the map. In some embodiments, the graphical depiction may be presented on a representation of a road, optionally along with a name of the road and/or proximate roads. The user of the unified user interface may provide user input to zoom out of the map. For example, the user may use pinch-to-zoom techniques to cause a zooming out of the map. Since the graphical depiction of the vehicle is positioned in the map, the graphical depiction may be reduced in size as the map is zoomed-out. In this way, the user may view a larger map depicting a larger region about the vehicle. Additionally, the user may cause translation of the map information via user input. Example user input may include swiping along a particular directions which causes the map to adjust an area depicted. Additionally, the graphical depiction of the vehicle may be removed from the combined view if it is not included in the adjusted area. Optionally, the map may zoom out such that the combined view includes an area encompassed by an area including the graphical depiction of the vehicle (e.g., based on its location) and the translated-to area (e.g., the adjusted area).

Contextual information may be updated by the user based on the map. For example, the user may select a location on the map. In this example, the unified user interface may present a route which the vehicle may follow to reach the location. Thus, the unified user interface may present the route as extending from the graphical depiction of the vehicle to the location.

If the user places the vehicle into drive, the system or processor may update the unified user interface to present a larger view of the graphical depiction of the vehicle. Thus, the contextual information may be updated to reflect that the user is driving according to navigation information. For example, and as will be described below, the unified user interface may present an autonomous visualization including a driving view of the vehicle through a real-world environment. The driving view may reflect a rear raised view of the vehicle driving through the environment towards the location. For example, lane markings, other vehicles, and so on, may be rendered in the unified user interface. The unified user interface may additionally present turn-by-turn directions. As an example, a left-turn arrow may be included prior to the user being required to turn left on a street.

In this way, and in contrast to the example user interface described above, the graphical depiction of the vehicle may be combined with map information. Thus, in substantially real-time, the unified user interface may dynamically adjust presentation of the graphical depiction and/or map information. For example, the map be dynamically zoomed-in, zoomed-out, and so on.

The vehicle may optionally include cameras or sensors which may be used to determine locations of other vehicles, locations of lanes, off-ramps, on-ramps, stop signs, traffic lights, and so on in substantially real-time. During navigation, the unified user interface may therefore indicate that the user has to move over a certain number of lanes to make a turn, take an off-ramp, and so on.

In one embodiment the unified user interface may present an autonomous visualization of the obstacle being included in the off-ramp. Optionally, the obstacle may be highlighted or otherwise called out to ensure that the user notices the obstacle. In some embodiments, the unified user interface may update to present an updated navigation route which avoids the off-ramp.

While the description above focused on navigation, it should be understood that such obstacles may be presented in the unified user interface during normal driving of the vehicle. For example, the unified user interface may present a large graphical depiction of the vehicle when in park. If the user places the vehicle into drive, the contextual information may be updated to reflect the vehicle is being driven. The unified user interface may thus be updated to present an autonomous visualization reflecting a driving view of the vehicle. For example, the driving view may include a rear raised view of the vehicle traversing a street or off-road area. The driving view may additionally indicate lane markings, other vehicles, stop signs, streetlights, pedestrians, potholes, rocks, obstacles or hazards, and so on. Additionally, the unified user interface may include map information, such as street names, locations of stop signs or traffic lights, names of proximate businesses or locations, and so on. The user may similarly zoom out of the map, such as via touch input or verbal commands, to cause the unified user interface to present a zoomed out view.

Unified User Interface—Vehicle Functionality User Interfaces

The unified user interface may additionally include icons associated with types of vehicle functionality. For example, the icons may enable selection of air conditioning functionality, music functionality, and so on as described herein. In contrast to the above-described example user interface, the unified user interface may ensure that the combined autonomous visualization and map information is not occluded. For example, if an end-user selects an air conditioning icon, a menu may be presented. Advantageously, the unified user interface may reduce a size associated with the combined autonomous visualization and map information. Additionally, the unified user interface may present the menu in a remaining portion of the unified user interface.

In some embodiments, the above-described dynamic sizing may be based on current contextual information. For example, if the user is navigating a complex series of streets, the unified user interface may increase a size associated with the combined depiction of the autonomous visualization and map information. In this way, the user may clearly view upcoming turns. Similarly, if there are upcoming hazards the unified user interface may increase a size of the map and depicted hazard to ensure the user is able to easily see the hazard.

Unified User Interface—Driver/Passenger Side Adjustments

For certain vehicles, such as trucks, a centralized display may be located greater than a threshold distance from the front driver and passenger seats. Thus, the driver may have easy access to a portion of the display proximate to the driver (e.g., a left side). In contrast, the driver may have more difficult access to a distal portion of the display (e.g., a right side). Similarly, the passenger may have easy access to the right side of the display and less access to the left side (in a car built for left-side drive). In some embodiments, the unified user interface may update based on whether the driver or passenger is interacting with the unified user interface.

As an example, icons associated with types of functionality may be presented on a driver side (e.g., along a left side from a top to a bottom of the display). Thus, the driver may easily access these icons. Upon selection of an icon, a menu or user interface associated with the icon may be presented on the driver side. In contrast, the unified user interface may present the icons on a passenger side. Upon selection of an icon, a menu or user interface associated with the icon may be presented on the passenger side.

As will be described, in some embodiments the unified user interface may update based on whether a driver or passenger is interacting, or is going to interact, with the unified user interface. For example, a system or processor may identify whether a driver or passenger is interacting with, or is about to interact with, the unified user interface. The system may optionally obtain information from infrared emitters or projectors. These may indicate whether an end-user's hands are reaching the unified user interface from a particular side of a display. The unified user interface may thus update based on the particular side after detection of the user's hand moving towards the display. The system may optionally obtain information based on one or more cameras positioned inside the vehicle. For example, the system may analyze video or images to determine whether a driver or passenger is using, or is going to use, the unified user interface.

The above embodiments of the unified user interface, and other embodiments, are described in more detail below.

Example Block Diagrams

FIG. 1A illustrates a block diagram of an example contextual user interface system 100 causing presentation of a user interface 102 (e.g., the unified user interface described herein). The contextual user interface system 100 may be a system of one or more processors, an application specific integrated circuit, and so on. The contextual user interface system 100 may be included in a vehicle, such as an electric vehicle, and may cause a display to present the user interface 102. The display may be, for example, a touch-sensitive display included in a front portion of the vehicle. For example, the display may be included in a central front portion of the vehicle.

The contextual user interface system 100 may receive user input 104 provided by a user of the user interface 102. Example user input 104 may include touch-based user input, verbal commands, and so on. In this way, the user of the user interface 102 may interact with the user interface 102. For example, the user may provide user input 104 to operate different aspects of the vehicle. In this example, the user may select from among icons 108A-108H. Each icon may enable control of a type of vehicle functionality. For example, icon 108A may enable control of certain driving functionality (e.g., control of steering sensitivity, acceleration characteristics, and so on). As another example, icon 108H may enable control of a music streaming application.

Thus, the contextual user interface system 100 may output vehicle operation information 106. For example, the information 106 may be provided to a system, module, application, and so on, which adjusts operation of the vehicle. As an example, the user may adjust a steering sensitivity. This vehicle operation information 106 may therefore reflect the adjustment, such that a system, module, software, application, associated with control of steering may be updated accordingly.

As illustrated, the user interface 102 includes an autonomous visualization (e.g., a graphical depiction 110A of a vehicle) along with map information 110B in a combined view. As described above, the graphical depiction 110A may reflect real-time operation information associated with the vehicle. For example, if the vehicle's lights are on, the graphical depiction 110A may be updated to present the lights being on. The map information 110B may represent a map proximate to a location of the vehicle. As will be described, this map information may be updated according to a current context associated with operation of the vehicle. For example, as the vehicle is being driven, the map may optionally zoom in to present a driving view. As another example, during navigation the map may optionally indicate a route the vehicle is to follow.

In some embodiments, the map information 110B may be used, at least in part, to render the autonomous visualization. For example, the autonomous visualization may include a graphical representation of an external (e.g., real-world environment) about the vehicle. In this example, sensor information (e.g., images from image sensors) may be analyzed by the system 100, or another processor or system in the vehicle, to render the graphical representation. The map information may be used to determine physical features or characteristics of the external environment. For example, a number of lanes may be identified based on the map information. As another example, roundabouts, upcoming lane movements or changes, upcoming highway interchanges, and so on, may be identified. In some embodiments, these physical features or characteristics may be used to inform the generation of the autonomous visualization. For example, the autonomous visualization may include a precise path of portions of the road which are upcoming and which may not be yet visible or which may be occluded. As another example, the combined view may be zoomed out, or translated, and the map information may inform generation of the autonomous visualization. For example, if a user adjusts the combined view to be translated forward one mile, or zoomed upward, then these portions of the external environment may not yet be visible. Advantageously, the map information may be used to render their appearance. For example, representations of buildings, and so on, may be included in teh combined view based on teh map information.

In FIG. 1A, the user interface 102 is presenting a navigation user interface 112. This interface may be usable by the user to indicate a location at which the user is to navigate. Advantageously, this navigation user interface 112 is positioned such that it does not occlude the combined view 110A-110B described above. Additionally, the navigation user interface 112 may be positioned on a driver side so the driver may easily interact with the user interface 112.

FIG. 1B illustrates a block diagram of the example contextual user interface system 100 presenting an updated user interface 102 based on received user input 104. In the illustrated embodiment, the user of the user interface 102 has provided user input 104 to enable navigation to a location. Thus, the navigation user interface 112 has updated to specify directions towards the location. Additionally, a route 114A is presented in the combined view 110A-110B. The route may be depicted on the map 110B as leading towards the location 114B.

In some embodiments, and as will be described below, the navigation user interface 112 may optionally be removed by the user interface 102 as the vehicle is driven. For example, the combined view 110A-110B may be dynamically increased in size. In this example, the combined view 110A-110B may include a more detailed autonomous visualization (e.g., a driving view).

The driving view, as an example, may represent a rear upward point of view of the graphical depiction 110A of the vehicle. As an example, the driving view may be similar to that of a camera or drone positioned a threshold distance behind and above the vehicle. A system or processor may use sensor data, such as images from image sensors, in combination with one or more machine learning models (e.g., convolutional neural networks or other computer vision techniques) to generate information for inclusion in the driving view. As an example, the machine learning models may analyze input images from image sensors positioned about the vehicle. In some implementations, the image sensors may provide a 360 degree view about the vehicle. These input images may be analyzed to classify vehicles (e.g., sedans, trucks, motorcycles), objects (hazards, potholes, speed bumps, pedestrians, stop lights, signal lights), and so on, which are depicted in the images. Optionally, the input images may be stitched together to provide a consistent view (e.g., 360 degree) view of the real-world environment in which the vehicle is located (e.g., via a machine learning model, such as a neural network). Images, or other sensor data, may be received at a particular frequency (e.g., 30 frames per second, 60 frame per second, 120 frames per second, and so on). These images may be analyzed to update the information included in the driving view.

In some embodiments, the user interface system 100 may access models associated with vehicles, objects, and so on.

The user interface system 100 may then render the models in accordance with received sensor data to generate the driving view. For example, the user interface system 100 may receive information indicating a present location associated with a proximate vehicle of a particular type (e.g., a truck). In this example, the user interface system 100 may render a model of a truck in the driving view which is consistent with the present location. As may be appreciated, the position of the rendered model in the driving view may be determined using camera parameters from one or more image sensors which obtained respective images of the truck. Thus, the position of the real-world truck may be translated into a position within the driving view. Additionally, in implementations in which images are stitched together, the resulting stitching may represent a map which indicates positions, sizes (e.g., bounding boxes), and so on, of vehicles and/or objects. This map may be used, for example by the system 100 or a different system or processor, to identify a position within the driving view at which to render the truck. While the use of models is described above, in some embodiments physical characteristics of a vehicle or object may be extracted from one or more images. As an example, a system or processor may generate an appearance of a vehicle or object for rendering in the user interface 102.

The driving view may therefore reflect a graphical representation of a real-world environment in which the vehicles is located. Graphical depictions of other vehicles may be presented as moving about the vehicle in conformance with their actual positions in the real-world environment. Additionally, road markings, signs, and so on, may be presented in the driving view. The user interface system 100 may update the user interface 102 in real-time (e.g., substantially real-time) to render the vehicles and/or objects included in the real-world environment. For example, images may be received, analyzed, and used to update the user interface 102.

As will be described in more detail below, with respect to FIG. 2B, the user interface system 100 may additionally update the user interface 102 to reflect navigation information. Thus, the combined view described herein may include an autonomous visualization, map information, and navigation information. For example, as the vehicle is being driving along a route, the user interface 102 may update to indicate navigation events. In this example, the user interface 102 may indicate that the user should move over one or more lanes, take a turn, and so on.

In some implementations, the vehicle may be operated in an autonomous or semi-autonomous mode. Thus, the driving view may provide insight into a view of the real-world environment as determined by a system or processor included in the vehicle. The user may view the driving view to ensure that the real-world environment is being properly interpreted. Additionally, the use of navigation information may proactively project to the user actions which the vehicle is to perform.

Thus, the user interface 102 may be dynamically updated according to a context associated with operation of the vehicle. For example, the navigation user interface 112 was presented in FIG. 1A based on user input 104 indicating selection of navigation functionality. Thus, the combined view 110A-110B was dynamically reduced in size to accommodate the navigation user interface 112. In FIG. 1B, the navigation user interface 112 presents directions towards the location. As described above, as the user begins driving the navigation user interface 112 may be dynamically removed. In this way, the user may focus on the combined view 110A-110B which may be updated to include navigation information (e.g., upcoming navigation events).

Example Flowcharts

Figure 2A:
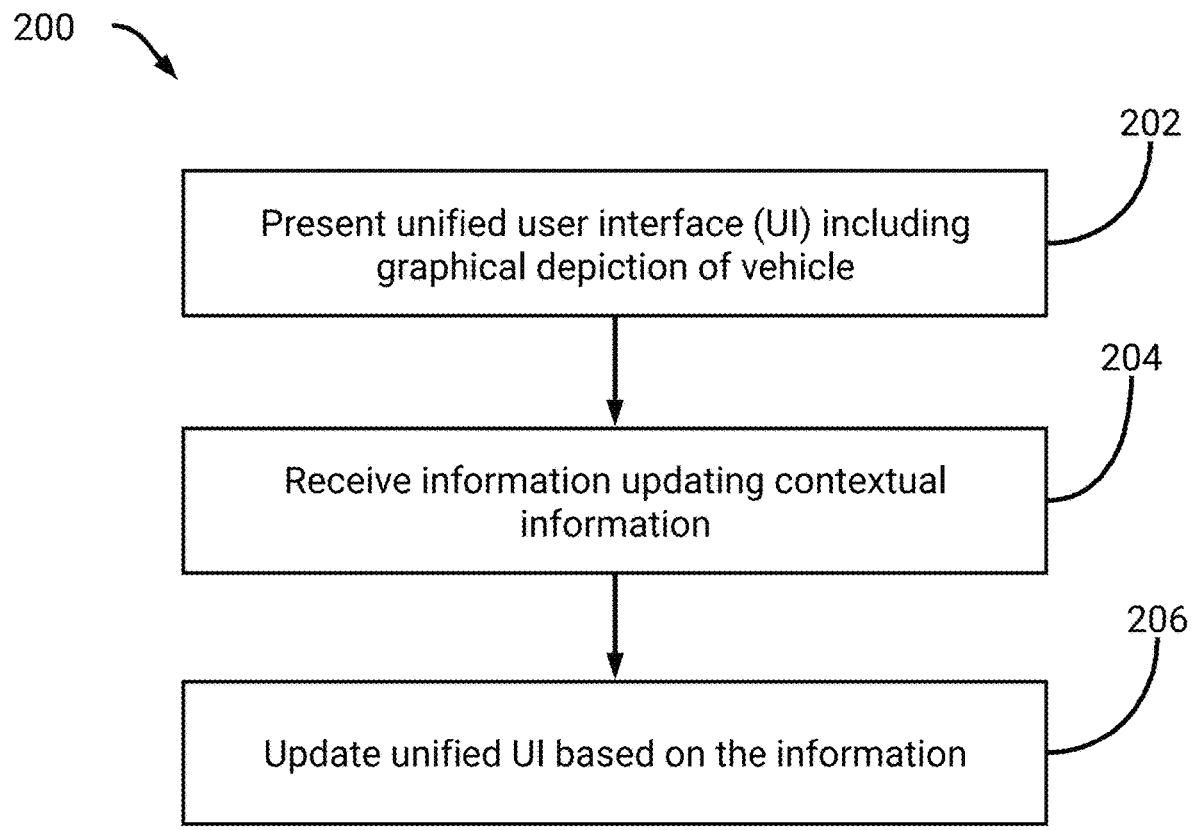
FIG. 2A is a flowchart of an example process for updating a unified user interface.

FIG. 2A is a flowchart of an example process 200 for updating a unified user interface. For convenience, the process 200 will be described as being performed by a system of one or more processors (e.g., the contextual user interface system 100).

At block 202, the system presents a unified user interface depicting a vehicle. As illustrated in FIGS. 1A-1B, the unified user interface may include an autonomous visualization (e.g., a graphical depiction of a vehicle). Additionally, the unified user interface may include map information. An extent to which the map information is zoomed in, or zoomed out, may be based on a current context associated with operation of the vehicle. For example, if the vehicle is in park the unified user interface may present a zoomed in view of the map. In this example, the graphical depiction of the vehicle may substantially fill a display presenting the unified user interface.

As another example, if the vehicle is being driven, the map information may be further zoomed out. As an example, the map information may be rendered in the unified user interface as a street view. In this example, the unified user interface may include the graphical depiction of the vehicle driving on a rendered version of a street. As another example, a view of the map information may represent a substantially top-down view. For example, during navigation unified user interface may cause the map to zoom out to indicate upcoming turns. In this example, the zooming out may occur based on a series of quick upcoming turns being identified. Thus, the unified user interface may advantageously depict the sequence of turns on the map information. As another example, the zooming out may occur based on an upcoming type of driving event. For example, exiting an off-ramp onto a surface road may cause zooming-out. As another example, the zoom-out may occur based on detection of a hazard. For example, a hazard may be detected using images from image sensors of the vehicle. In this example, the route may be updated to avoid the hazard and the map information may be zoomed out to depict at least a portion of an updated route.

The unified user interface may additionally include a menu or user interface associated with a type of vehicle functionality. As described herein, this menu or user interface may be positioned next to the map information. Thus, a user of the unified user interface may interact with the menu while maintaining a view of the map information.

At block 204, the system receives information updating contextual information. The user of the unified user interface may provide user input to update a context associated with operation of the vehicle. For example, the user may indicate that the unified user interface is to present navigation information towards a location. As another example, the user may provide user input selecting an icon associated with a type of vehicle functionality.

The received information may additionally not be based on user input. For example, cameras or sensors positioned about the vehicle may be used to identify hazards, traffic lights, stop signs, environmental conditions, and so on. This information may be used to update the unified user interface. For example, if the vehicle is being driving in an off road environment, the environmental conditions may reflect a fast moving body of water ahead or an incline greater than a threshold angle. Similarly, the received information may additionally relate to a location or position of the vehicle. As will be described in FIG. 2B, the system may update the unified user interface depending on a location of the vehicle with respect to a navigation route. For example, the combined view described herein may be zoomed in, zoomed out, and so on depending on the location.

At block 206, the system updates the unified user interface based on the information. With respect to user input associated with an icon, the unified user interface may update to include a menu or user interface associated with the icon. Similarly, if the user enters a navigation mode, the unified user interface may be updated to include navigation directions on the combined view of the vehicle and map, and so on.

With respect to information determined from image sensors or other sensors (e.g., radar, ultrasound), the unified user interface may update to reflect this information. For example, if a stop sign is approaching, the unified user interface may highlight the detected stop sign. As another example, the vehicle may be automatically stopped at the stop sign and information in the unified user interface included to reflect this stopping. If a hazard, such as a pothole, is detected, the unified user interface may be updated to depict the hazard in the combined view. With respect to the driving view described above, the unified user interface may indicate a location of the pothole on a portion of street the vehicle is approaching. Optionally, the unified user interface may present information indicating the user should adjust lanes.

Advantageously, when updating the unified user interface, the system may optionally ensure that the combined view of the autonomous visualization (e.g., depiction of the vehicle and optionally proximate vehicles and/or objects) and map is not occluded. For example, the system may cause navigation information to be overlaid onto the combined view. As another example, the system may include information determined using cameras and/or sensors in the combined view. As another example, the system may present a menu or user interface associated with vehicle functionality separate from that of the combined view. In this example, the system may dynamically re-size and/or adjust position of the combined view. For example, the combined view may be reduced in size and, if the driver is operating the user interface, positioned to a passenger (e.g., right) side of the user interface.

Optionally, the unified user interface may present images or video from a camera positioned on the vehicle. As will be described in more detail below, the unified user interface may present the images or video proximate to the combined view. These may be triggered for presentation, for example, if the vehicle is towing something. These may also be triggered if the vehicle is in an off-road mode. Examples of presenting imagers or video from a camera are included below.

Figure 2B:
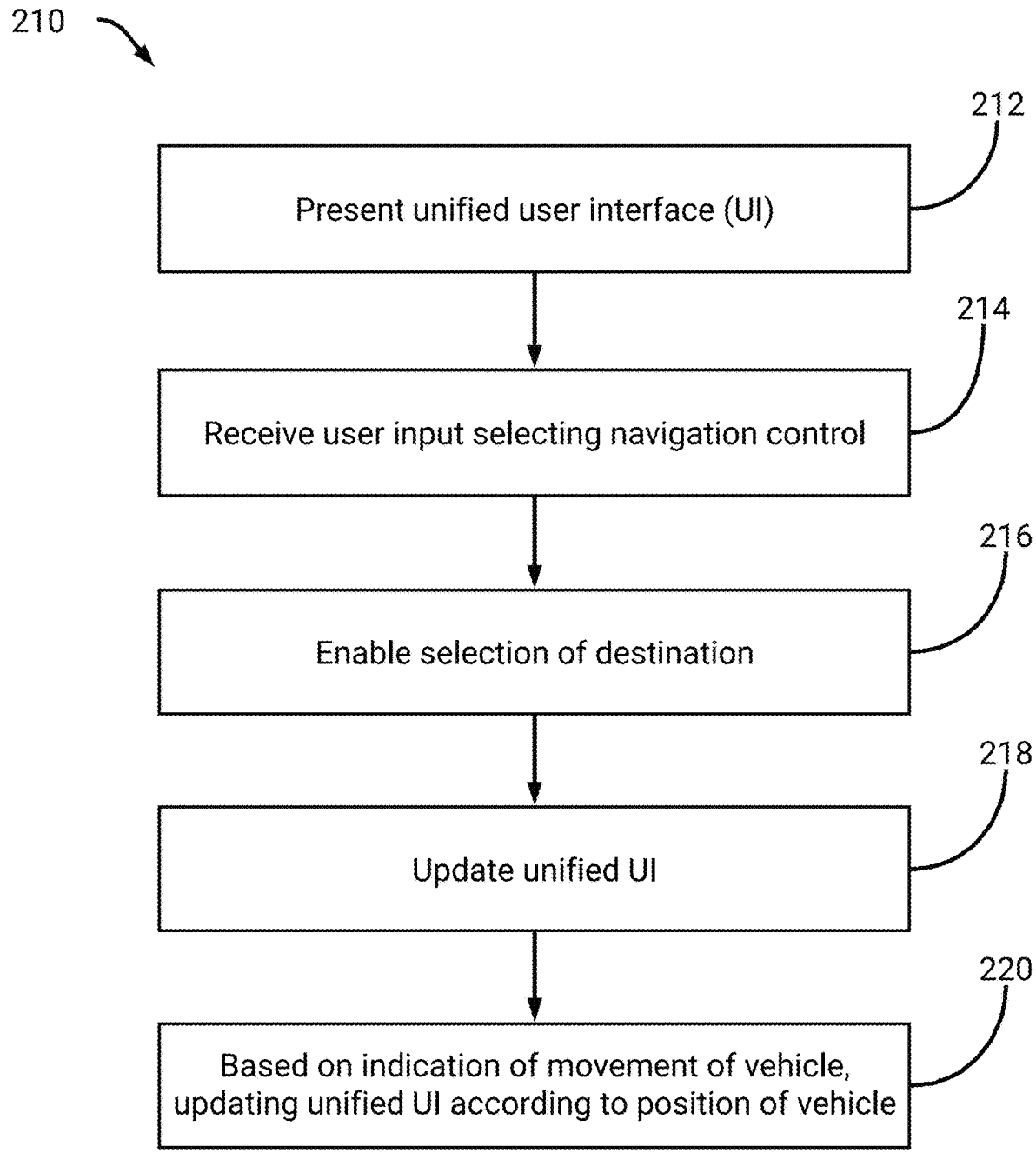
FIG. 2B is a flowchart of an example process for updating a unified user interface according to a position of a vehicle.

FIG. 2B is a flowchart of an example process 210 for updating a unified user interface according to a position of a vehicle. For convenience, the process 210 will be described as being performed by a system of one or more processors (e.g., the contextual user interface system 100).

At block 212, the system presents a unified user interface via a display. At block 214, the system receives user input selecting navigation control. As described above, with respect to FIGS. 1A-1B, the unified user interface may allow for navigation functionality. At block 216, the system receives selection of a destination. The user may provide user input indicating a location to be navigated towards. For example, the user may specify a name associated with the location. The user may also use a search user interface to search for a location.

At block 218, the system updates the unified user interface to depict a combined view of an autonomous visualization (e.g., a graphical depiction of the vehicle) included on a graphical representation of a map. As illustrated in FIG. 1B, the user interface may update to reflect route information associated with a route to the location. Thus, the combined view may reflect a substantially top-down view of the map in which the vehicle is depicted. For example, the combined view may represent a rendered view of a real-world environment in which a render or virtual camera is positioned a threshold distance above the vehicle.

At block 220, the system updates the unified user interface based on movement of the vehicle. As described above, as the vehicle moves the system dynamically adjusts the combined view. For example, the unified user interface may depict a driving view in which a back portion of the vehicle is illustrated as navigating along the route. The driving view may therefore represent a rendered view of the real-world environment in which a render or virtual camera is positioned at the back portion of the vehicle.

The system may update the unified user interface based on updated contextual information, such as updates to the vehicle's position with respect to the route. For example, the system may maintain the driving view of the back portion of the vehicle while there are less than a threshold upcoming navigation events. As an example, if the vehicle is driving along a highway with no upcoming turns or lane changes, then the system may maintain the driving view such that the driving view encompasses a substantial portion of the display. As another example, if the route indicates a threshold number of upcoming driving events then the system may update the combined view to zoom-out. For example, the autonomous visualization and map information may be zoomedout. In some embodiments, when zooming out the autonomous visualization may remove certain visualizations (e.g., visualizations of other vehicles, pedestrians, signs, road markings, and so on) while retaining the graphical depiction of the vehicle. Upcoming navigation events may be identified on the map information. For example, an indication of the route may be graphically included for these navigation events.

In some embodiments, the system may zoom in or zoom out depending on the vehicle's position and one or more complexity measures associated with the route. As an example, the system may determine the complexity measures for an upcoming portion of the route which is within a threshold distance of the vehicle's position or within a threshold driving time of the vehicle's position. Based on the complexity measures, the system may update the combined view. For example, if the upcoming portion of the route has a higher complexity measure then the system may zoom out to depict a greater number of navigation events.

The complexity measures may relate to a number of upcoming turns, a number of upcoming lane changes, a number of upcoming driving maneuvers (e.g., U-turns), and so on. In some embodiments, the above information may be associated with different weights. Thus, a number of upcoming turns may be associated with a higher complexity measure as compared to a number of lane changes. Additionally, the complexity measures may relate to likelihoods associated with missing an upcoming navigation event. For example, a likelihood may relate to historical information. In this example, a complexity measure may increase if prior drivers of vehicles have missed one or more of the upcoming navigation events.

Advantageously, if the user selects vehicle functionality, such as via selection of an icon, a menu associated with the functionality may be presented next to the driving view. In this way, the user may control the functionality without the driving view being occluded.

Figure 2C:
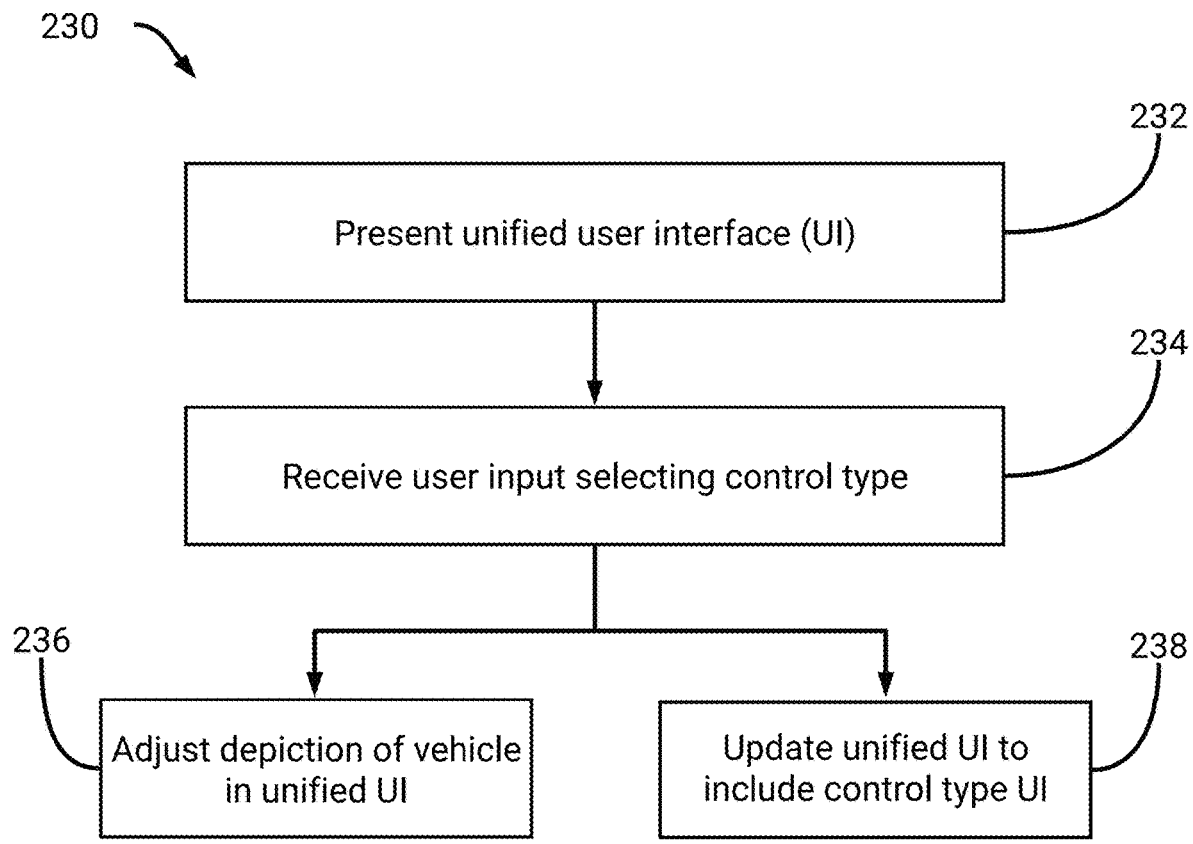
FIG. 2C is a flowchart of an example process for updating a unified user interface based on selection of vehicle functionality.

FIG. 2C is a flowchart of an example process 230 for updating a unified user interface based on selection of vehicle functionality. For convenience, the process 230 will be described as being performed by a system of one or more processors (e.g., the contextual user interface system 100).

At block 232, the system presents a unified user interface via a display. At block 234, the system receives user input indicating particular vehicle functionality. For example, the unified user interface may include a multitude of icons associated with different vehicle controls (e.g., air conditioning, music, and so on as described herein). A user may select a particular icon to adjust a corresponding vehicle control. For example, the user may provide touch input to the display. As another example, the user may provide a verbal command for interpretation by the system or another process or system (e.g., included in the vehicle or in wireless communication with the vehicle). As described herein, contextual information may be updated to reflect selection of particular vehicle functionality.

At block 236, the system adjusts an autonomous visualization (e.g., a graphical depiction of a vehicle) in the unified user interface. Certain vehicle functionality may adjust the graphical depiction of the vehicle. For example, the user may adjust the lights on the vehicle (e.g., fog lights, high beam lights, and so on). In this example, the system may update the graphical depiction accordingly. As another example, the user may adjust suspension on a truck. In this example, the graphical depiction may indicate a raising or lowering of the truck. As another example, the user may cause wipers to initiate and the depiction may show movement of the wipers. As another example, the user may cause a tonneau cover to open or close and the depiction may illustrate this opening and closing.

At block 238, the system updates the unified user interface to include a menu or user interface associated with the functionality. For example, a control type user interface may be included. As described herein, the menu or user interface may be presented such that it does not occlude the depiction of the vehicle and map. For example, the depiction of the vehicle and map may be resized (e.g., reduced in size). Thus, the user may interact with the menu or user interface while maintain view of the map.

Figure 3A:
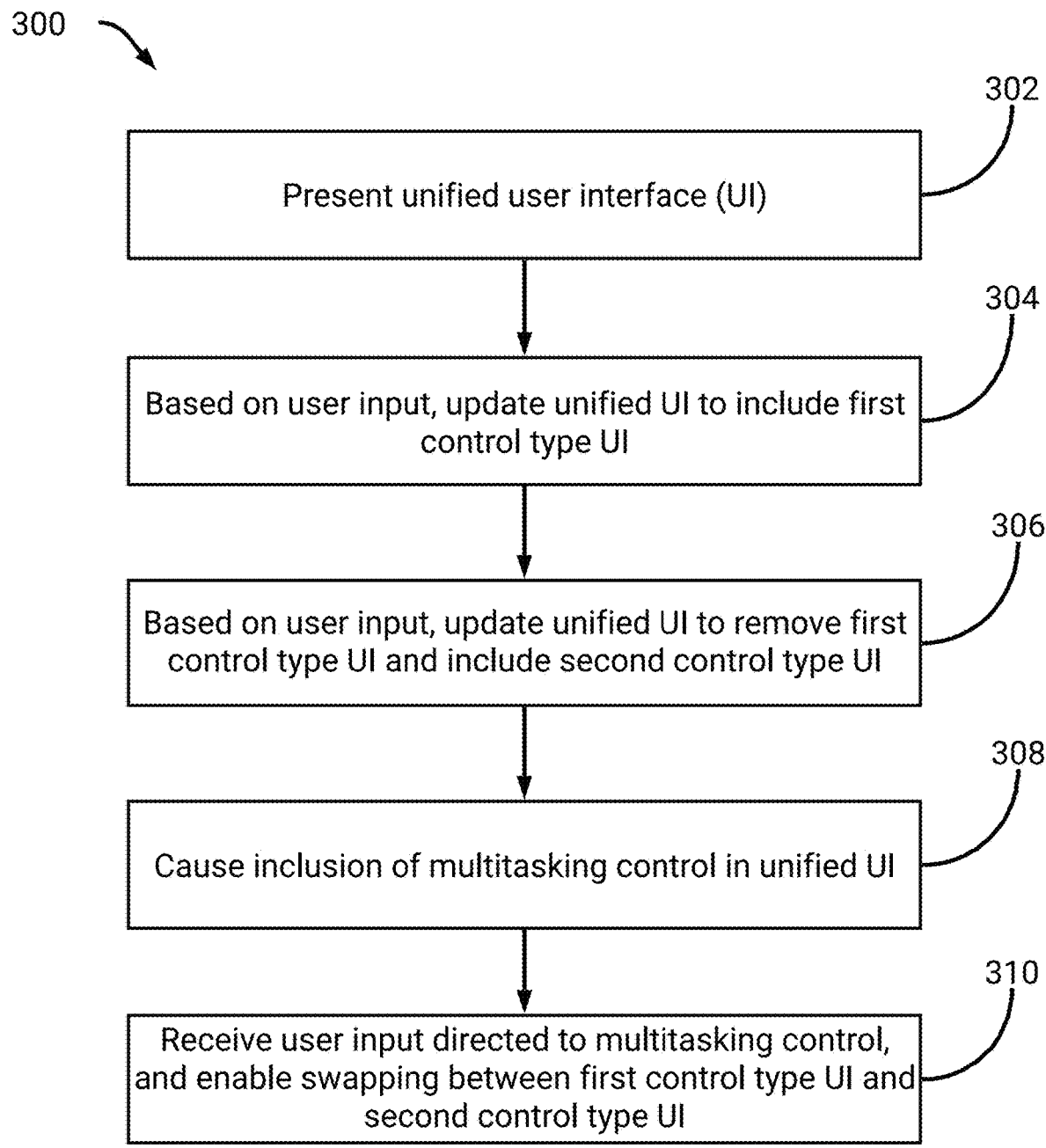
FIG. 3A is a flowchart of an example process for using a multitasking control of a unified user interface.

FIG. 3A is a flowchart of an example process 300 for using a multitasking control of a unified user interface. For convenience, the process 300 will be described as being performed by a system of one or more processors (e.g., the contextual user interface system 100).

At block 302, the system presents a unified user interface. At block 304, the system receives user input indicating selection of a first control type. For example, a user of the user interface may select an icon associated with certain vehicle functionality. At block 306, the system receives selection of a second control type. In response, the system may remove a menu or user interface associated with the first control type. Instead, a menu or user interface associated with the second control type may be included.

At block 308, the system updates the unified user interface to include a multitasking control. This control may enable the rapid switching between recently selected vehicle functionality. For example, the user may switch between the first control type and second control type via manipulating the multitasking control. In some embodiments, the multitasking control may represent one or more lines included along a same axis (e.g., horizontal direction). The user may use a swiping motion to move between the different menus or user interfaces associated with the first control type and second control type.

At block 310, the system receives user input directed to the multitasking control. The user input may include, for example, a selection of the multitasking control on a touchscreen display. For example, the user may swipe along one or more axes (e.g., a horizontal axis). The user input may additionally include a verbal command associated with the multitasking control. As described above, the user may rapidly switch between the first control type and second control type.

Figure 3B:
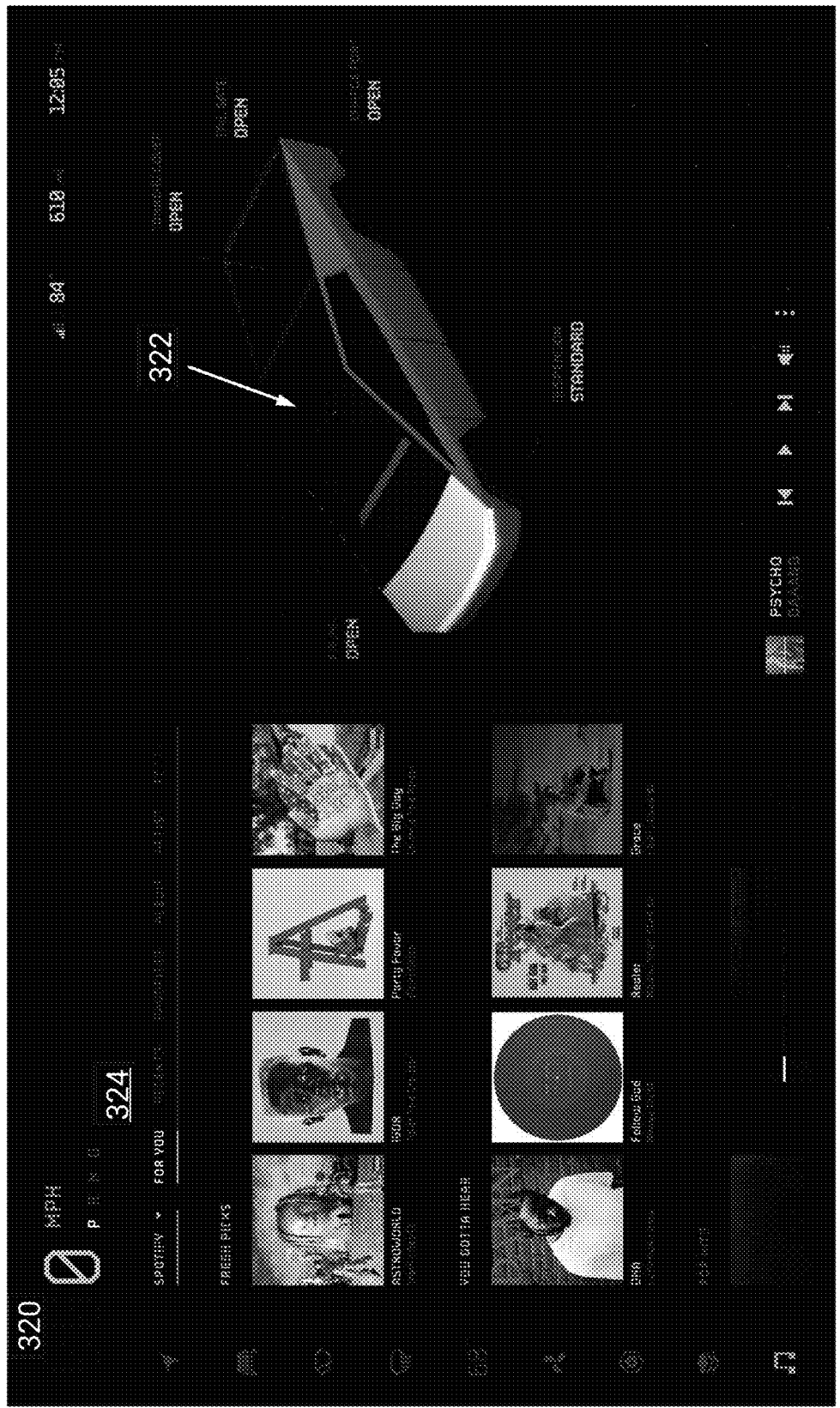
FIG. 3B illustrates a user interface presenting a depiction of a vehicle along with a music user interface.
Figure 3C:
FIG. 3C illustrates the user interface presenting the depiction of the vehicle along with a quick control user interface.
Figure 3D:
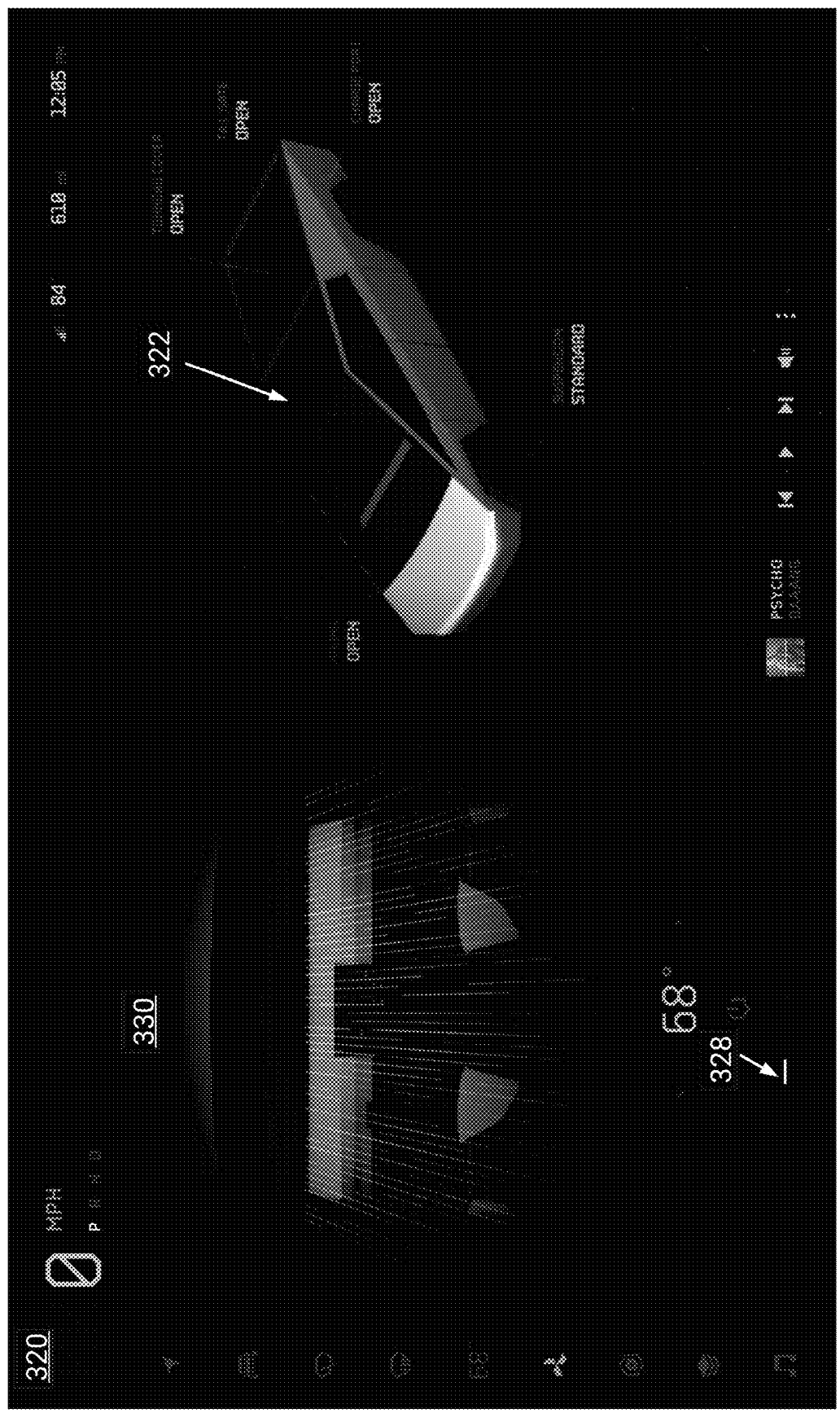
FIG. 3D illustrates the user interface with a climate user interface being presented.

Reference will now be made to FIGS. 3B-3D which illustrate user interfaces associated with multitasking control. FIG. 3B illustrates a user interface 320 presenting a depiction of a vehicle 322 along with a music user interface 324. For example, the vehicle may be in a park mode. The description below may additionally be applied if the vehicle were driving or navigating. For example, a combined view of an autonomous visualization and map information may be presented in the user interface 320.

FIG. 3C illustrates the user interface 320 presenting the depiction of the vehicle 322 along with a quick control user interface 326. For example, the user may have interacted with the music user interface 324 and either closed it or selected an icon associated with user interface 326.

As illustrated in FIG. 3C, a multitasking control 328 is included. Each line of the multitasking control line may represent a different user interface. Thus, selection of a line (e.g., via input to a line or via swiping) may result in presentation of a different user interface.

For example, a left-most line may correspond with the quick control user interface 326. As another example, a right-most line may correspond with the music user interface 324. In some embodiments, a most recently presented user interface may be included closest to a user of the user interface 320. In this example, a driver may be operating the user interface 320. Thus, the most recently used user interface may be the line on the left. If the passenger were operating the user interface 320, the most recently used user interface may be the line on the right. As illustrated, the left-most line is highlighted, representing that the associated user interface is being presented (e.g., user interface 326).

FIG. 3D illustrates the user interface 320 with a climate user interface 330 being presented. As depicted, the multitasking control 328 includes three lines. In some embodiments, the user interface 320 may limit a number of lines. Thus, a user may select between a threshold number of recently used vehicle functionality. In some embodiments, above the lines the user interface 320 may include a live view or representation of associated vehicle functionality. For example, above the middle line a live view of the quick control 326 user interface may be included. In some embodiments, the live views may be presented based on the system identifying that a user is about to interact with the user interface 320. For example, infrared emitters, cameras, or other sensors, may be used to determine that the user is about to interact with, or is interacting with, the user interface 320.

Figure 4:
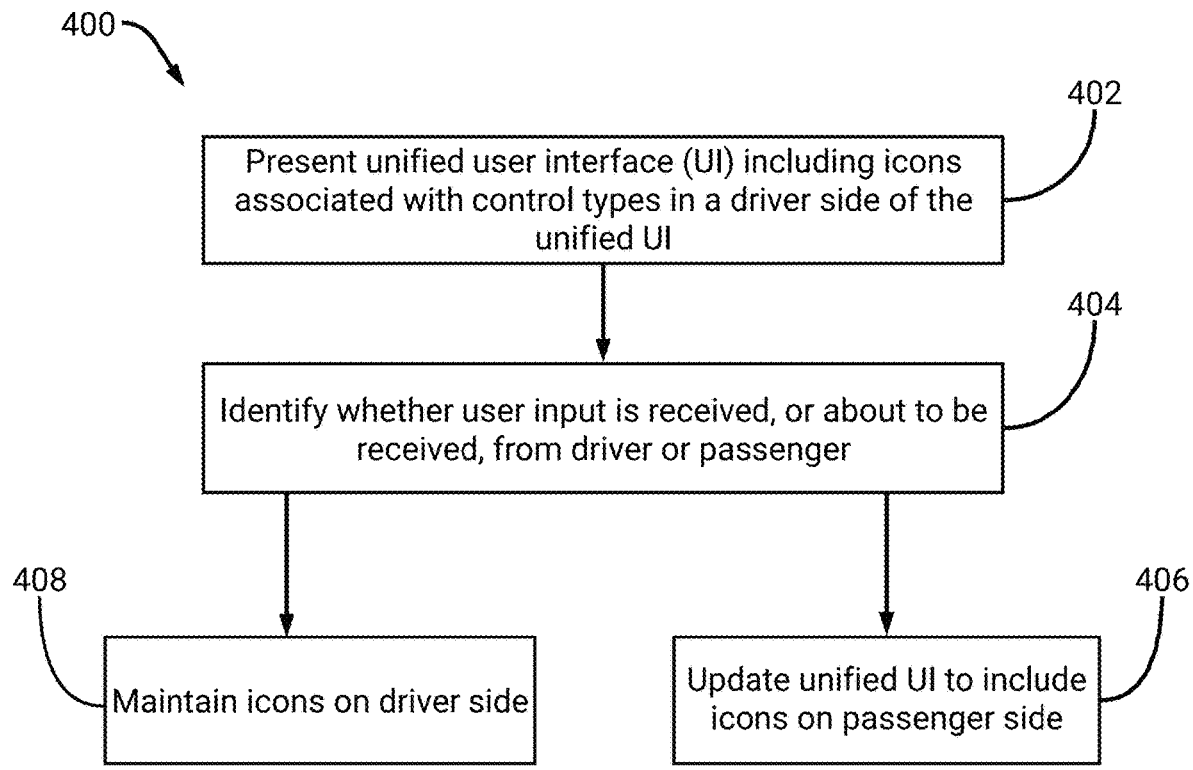
FIG. 4 is a flowchart of an example process for adjusting icons to a driver or passenger side.

FIG. 4 is a flowchart of an example process 400 for adjusting icons to a driver or passenger side. For convenience, the process 400 will be described as being performed by a system of one or more processors (e.g., the contextual user interface system 100).

At block 402, the system presents a unified user interface via a display. Icons associated with vehicle functionality may be presented on a driver side of a display presenting the unified user interface. In some embodiments, the icons may be presented on the driver side when the display turns on. For example, the display may turn on when a driver enters the vehicle. In some embodiments, the system may determine whether a driver or passenger is in the vehicle when the display turns on. For example, if only a passenger enters the vehicle, the icons may be placed on the passenger side. In this example, the system may use sensors in the seat to determine that the passenger is seated. The system may also identify that the passenger side door was used. The system may also use cameras, or other sensors, facing within the vehicle to identify that the passenger is in the vehicle. Similarly, the system may use cameras, facing outside of the vehicle to identify that the passenger has entered or is going to enter the vehicle.

At block 404, the system identifies whether user input is received, or is about to be received, from a driver or passenger. The system may use infrared emitters or projectors to determine that a hand is moving towards the display. The system may also use cameras to determine movement of the hand. In some embodiments, machine learning models may be leveraged to differentiate between movement towards the display and movement towards a center of the vehicle (e.g., to access a center console or drink).

At block 406, the system updates the icons to be on the passenger side. If the system identifies the passenger as providing user input, the system may update the icons to be on his/her side. In contrast, at block 408 the system may maintain icons on the driver side if the user input is being provided from the driver side.

As described above, selection of an icon may cause an associated vehicle control user interface to be presented. This user interface may be presented so as not to occlude a combined view of an autonomous visualization and map information. For example, a size associated with the combined view may be reduced and the combined view may be positioned further from the passenger or driver. As an example, if the system determines that the passenger is providing user input then the system may present the vehicle control user interface on the passenger side. Similarly, the system may present the combined view proximate to the driver side.

Example User Interfaces

Example embodiments of the unified user interface are described below. It may be appreciated that each user interface may describe one or more embodiments, and certain aspects or features of these user interfaces may be adjusted and fall within the scope of the disclosure herein. These use interfaces may be presented via a display included in a vehicle. In some embodiments, the display may be a touch-sensitive display. The user interfaces may be rendered by a system or processor included in the vehicle, such as the user interface system 100 described above.

Figure 5A:
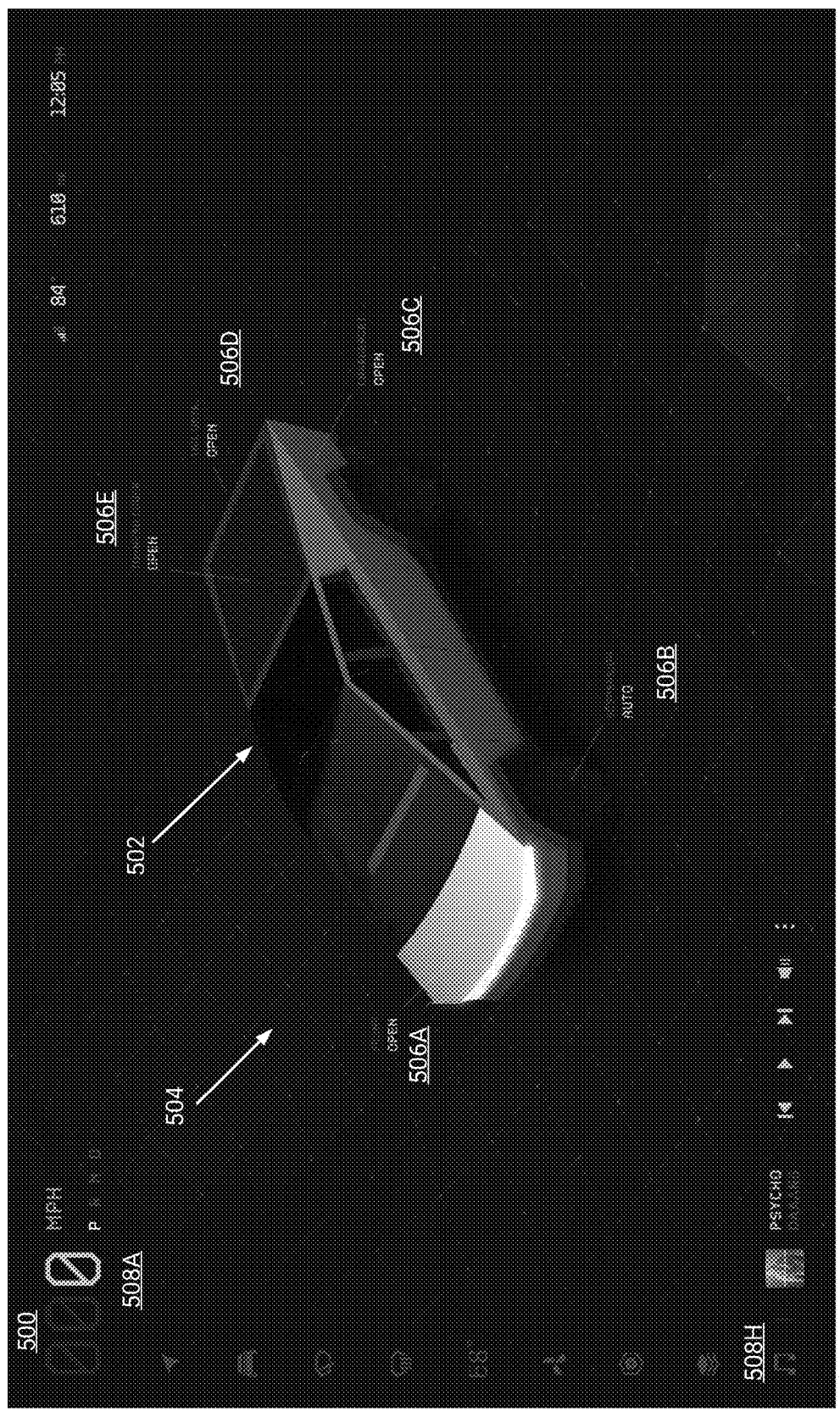
FIG. 5A illustrates an example user interface of a parked vehicle.

FIG. 5A illustrates an example user interface 500 of a combined view illustrating a parked vehicle. As illustrated a graphical depiction 502 of the vehicle is included in the user interface. Additionally, a representation 504 of an environment is included. For example, an autonomous visualization may be rendered which includes the graphical depiction 502 and representation 504. In addition, the user interface 500 may optionally include map information. For example, an indication of a street name at which the vehicle is parked may be included. As another example, stores, restaurants, and so on, may be depicted in the representation 504. These may be obtained, for example, from street view information. Contextual information may, in some embodiments, therefore reflect the vehicle being parked.

Optionally, the combined view may include topographical information. For example, the vehicle may be parked while off-roading. In this example, the autonomous visualization may include a graphical representation of a terrain surrounding the vehicle. For example, sensor information (e.g., images) may be obtained of the terrain. Map information may be used to inform the topographical information. For example, a topographical map may be accessed for a location of the vehicle. The user interface 500 may thus include a representation of the terrain based on the topographical map. Optionally, sensor information and the topographical map may be combined. As an example, the topographical map be used to determine a shape associated with the location of the vehicle. Sensor information may then inform the shape, or other fine-grained information. For example, the sensor information may indicate that a portion of the terrain is more sharply sloped than indicated on the topographical map. This may be helpful to a user who is off-roading in the vehicle. Thus, the representation 504 may be based on topographical information of the surrounding area.

As described above, the representation 504 may include information determined using cameras or sensors positioned about the vehicle. For example, pedestrians, other cars, cones, animals, lights, stop signs, and so on, may be determined by a system included in the vehicle. These may be rendered in the user interface 500. Similarly, the representation 504 may include rocks, dips, inclines, and so on, of an off-road area surrounding the vehicle. In some embodiments, a drone may be stored in the vehicle. The drone may fly from the vehicle and perform a mapping operation of surrounding terrain. For example, photogrammetry techniques may be used. This information may be provided to the vehicle, and used to render the representation 504. In some embodiments, the vehicle may render the representation 504 using, at least in part, simultaneous localization and mapping (SLAM) techniques.

The depiction 502 of the vehicle includes selectable options 506A-506E. Each selectable option may be used to operate the vehicle. For example, option 506A may cause a front truck to open. Option 506E may cause a tonneau cover to open. Similarly, icons 508A-508H may be used to present a menu or user interface associated with different vehicle functionality. For example, icon 508H may cause presentation of a menu or user interface associated with streaming music. As described above, if this icon 508H is selected, the user interface 500 may update to reduce a size associated with the depiction 502 of the vehicle and associated environment 504. In this way, a user of the user interface may interact with a music streaming application.

Figure 5B:
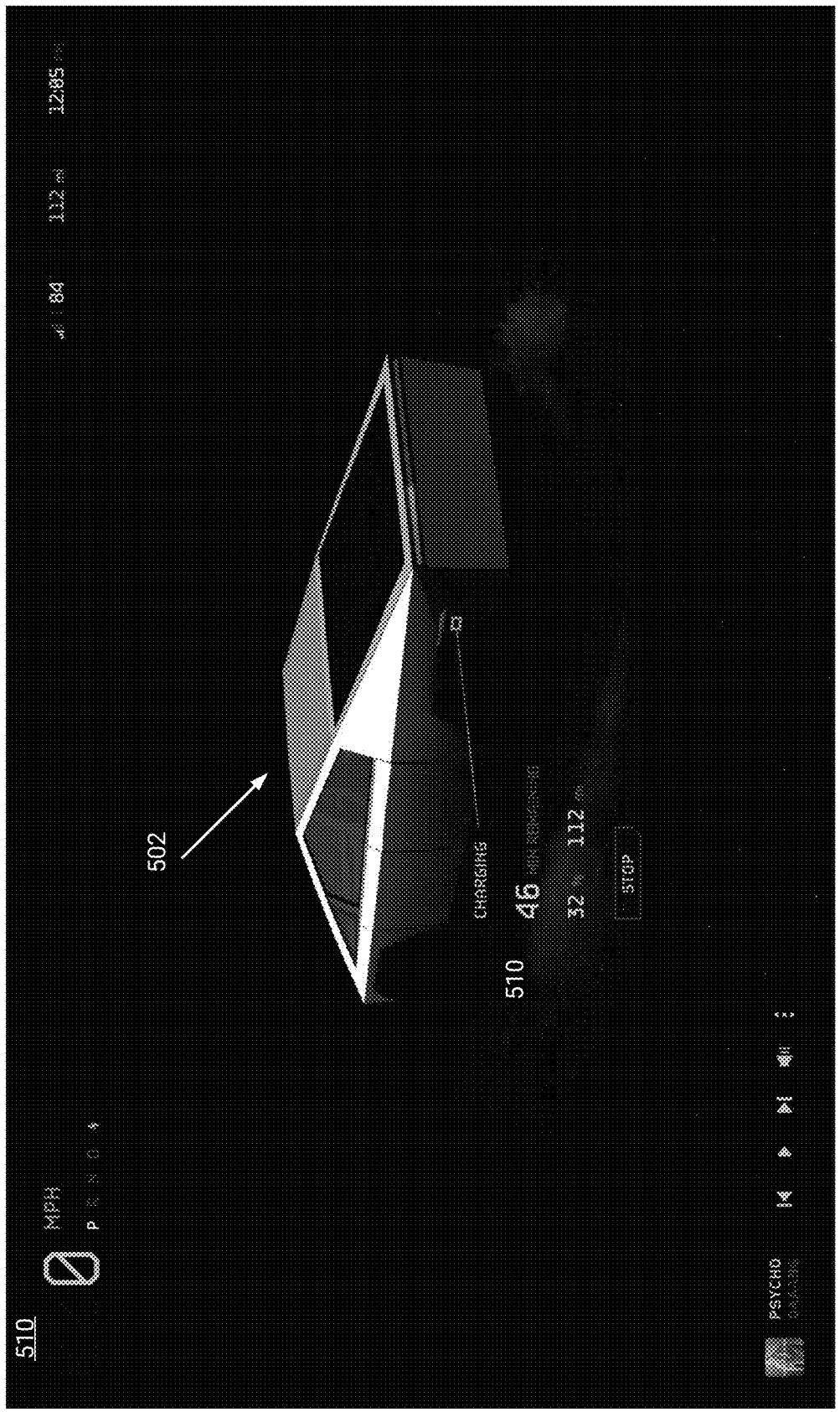
FIG. 5B illustrates an example of a user interface indicating a parked vehicle while the vehicle is being charged.

FIG. 5B illustrates a user interface 510 of the parked vehicle being charged. As illustrated, the depiction 502 of the vehicle reflects charging of the vehicle. For example, charging information 510 is included in the user interface. Contextual information may therefore reflect, in some embodiments, the vehicle being charged.

Figure 6A:
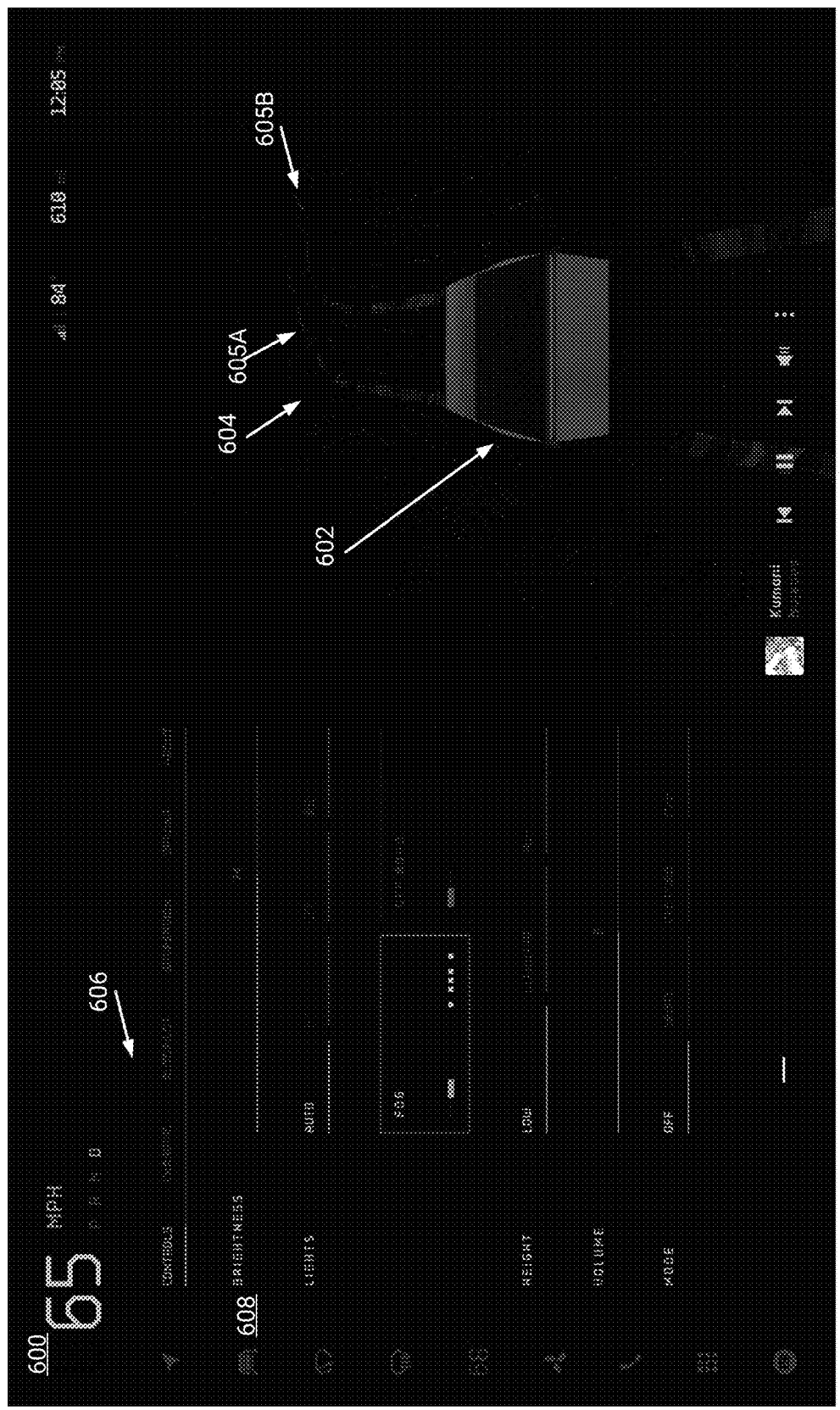
FIG. 6A illustrates an example user interface of a driving view.

FIG. 6A illustrates an example user interface 600 of a driving view. In this example, an autonomous visualization is included in the user interface 600. The visualization may include a graphical depiction 602 of the vehicle along with a representation of an example environment 604 in which the vehicle is being driven. As described above, this example environment 604 may be rendered based on map information (e.g., satellite information, topographical maps, and so on). The environment 604 may also be rendered using cameras and/or sensors positioned on the vehicle. Thus, a user of the user interface 600 may view upcoming hazards, changes in incline, and so on.

In the illustrated example, the user interface 600 includes lines 605A-605B the user may follow. In off-roading conditions, it may be advantageous for the user to quickly view example lines to be followed. In this way, if a hazard appears the lines may indicate that the user should avoid this hazard. The lines may be determined using sensors and/or cameras on the vehicle. For example, the lines 605A-605B may be determined based on existent road markings (e.g., tire marks). As another example, the lines 605A-605B may be determined based on a width of the vehicle and terrain information. In this example, the lines 605A-605B may be positioned such that it causes the vehicle to stay further than a threshold distance of a raised portion or wall portion of the terrain. Thus, the lines 605A-605B may indicate a substantially flat, or drivable, portion of the upcoming terrain.

The user interface 600 further includes a quick control user interface 606. This quick control user interface 606 may be presented based on user selection of an associated icon 608. Upon presentation of the quick control user interface 606, the user interface 606 may update to re-size the combined view described herein. For example, and as illustrated, the combined view is positioned in a right portion of the user interface 606 and reduced in size (e.g., reduced in width). The user may cause the quick control user interface 606 to disappear, for example upon selection of information in the user interface 606. The combined view may then dynamically increase in size to encompass more of the user interface 600.

While the example of FIG. 6A illustrates an off-roading environment, the environment 604 may also represent on-road environments. For example, it may depict a city road or highway upon which the vehicle is being driven.

Figure 6B:
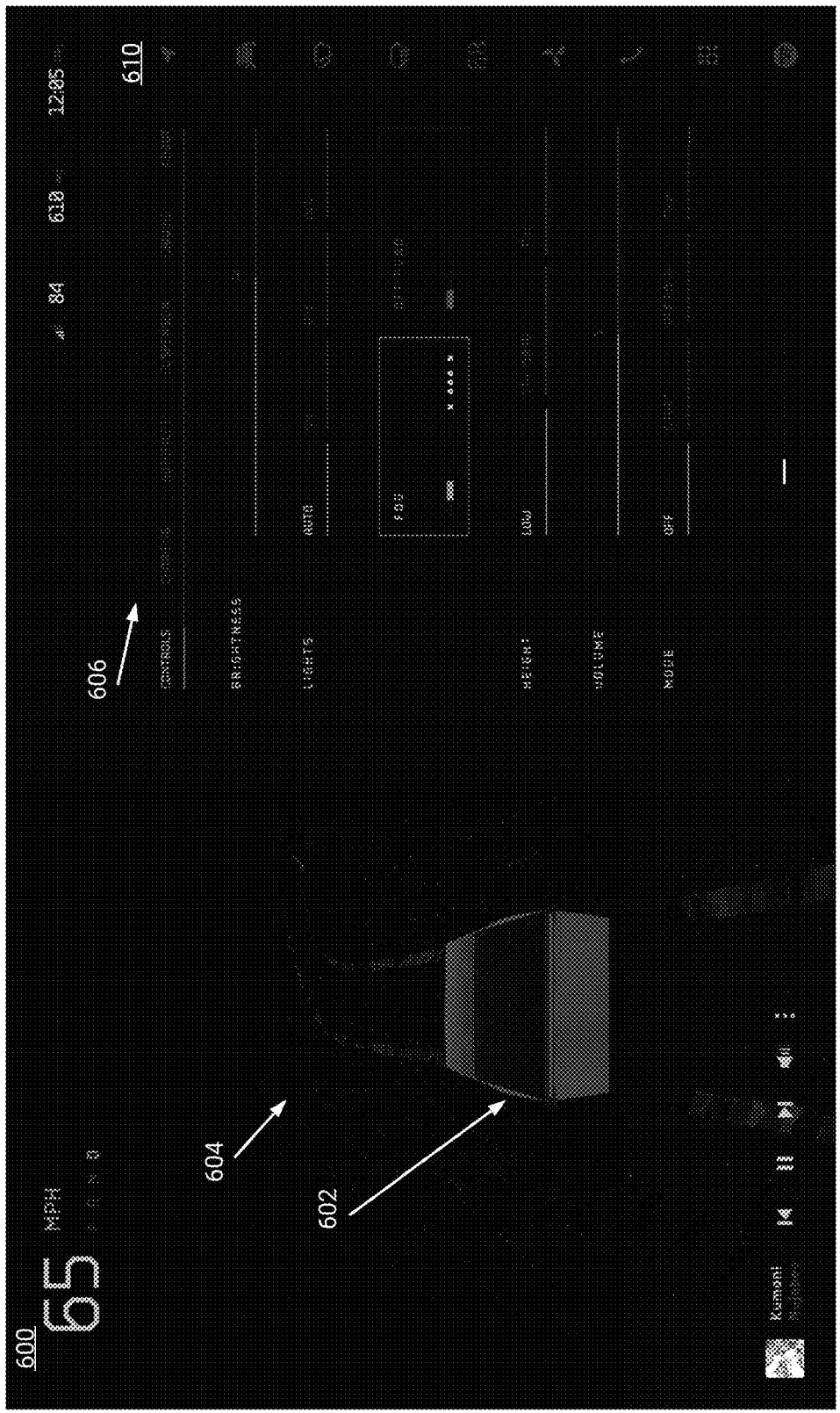
FIG. 6B illustrates the example user interface of a driving view with icons adjusted for a passenger view.

FIG. 6B illustrates the example user interface 600 with icons 610 adjusted for a passenger view. As described at least in FIG. 4, icons 610 may be updated in position based on whether a passenger or driver is accessing the user interface 600. In the illustrated embodiment, the quick control user interface 606 has been moved to a passenger (e.g., right) side of the user interface 600 along with the icons 610. Similarly, the autonomous visualization (e.g., vehicle 602 and environment 604) has moved to a driver side.

Figure 6C:
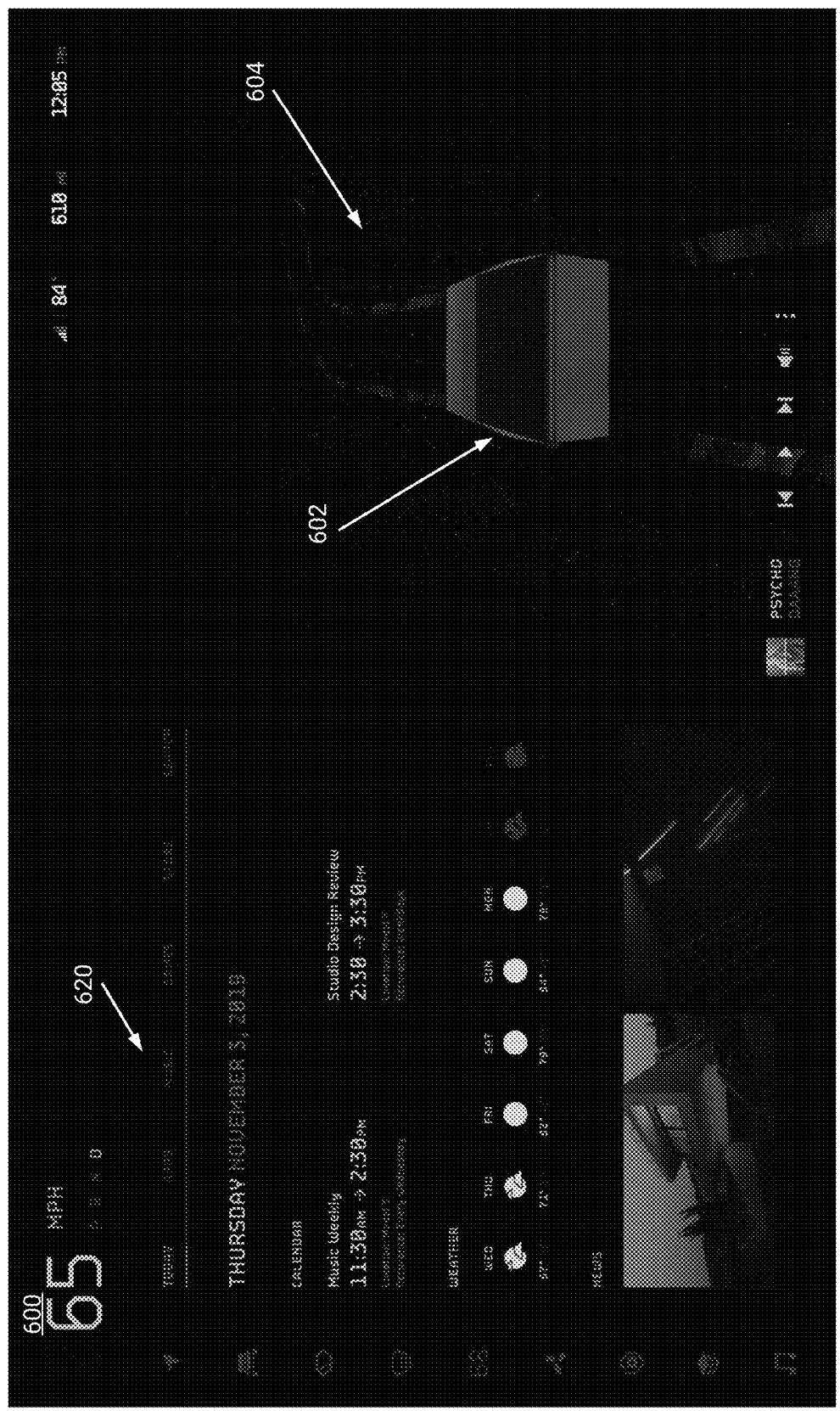
FIG. 6C illustrates the example user interface of a driving view with a today user interface.

FIG. 6C illustrates the example user interface 600 with a today user interface 620. The today user interface 620 may present weather information, calendar information, and so on as illustrated.

Figure 6D:
FIG. 6D illustrates the example user interface of a driving view with an air conditioning user interface.

FIG. 6D illustrates the example user interface 600 with an air conditioning user interface 630.

Figure 7A:
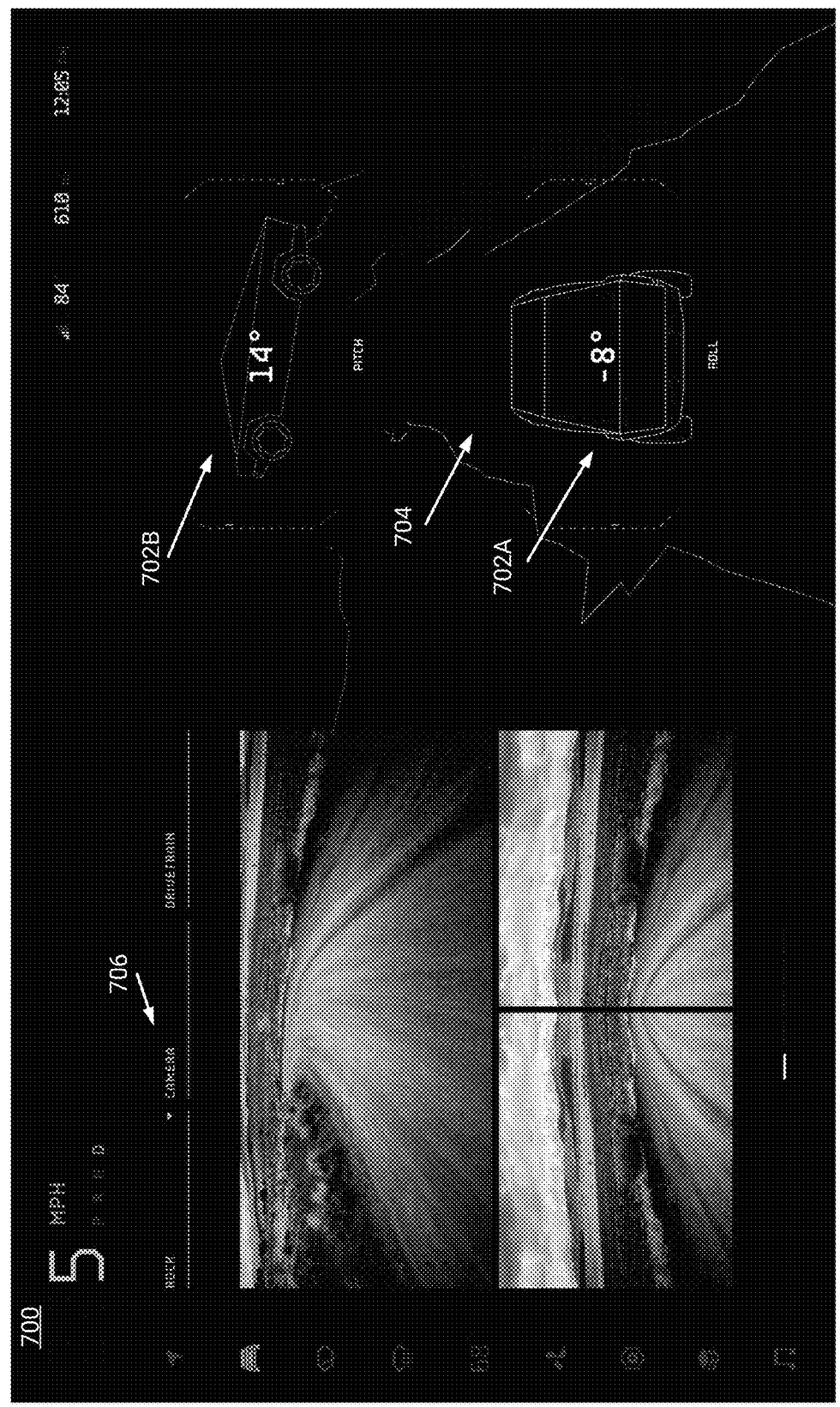
FIG. 7A illustrates an example user interface of a driving view while driving the vehicle in an "off-road" environment.

FIG. 7A illustrates an example user interface 700 of a driving view associated with off-roading. In this user interface 700, an autonomous visualization (e.g., a depiction 702A of a vehicle and an environment 704 in which the vehicle is driving) is illustrated. Additionally, the user interface 700 may include map information which informs a topology of the environment 704. The unified user interface described herein may, in some embodiments, automatically present off-roading information based on detected road conditions. For example, a system or processor included in the vehicle may determine when off-road conditions are detected and cause the user interface 700 to present off-roading information. In this example, off-roading conditions may be detected based on detected driving conditions. Thus, in some embodiments contextual information may reflect the off-road conditions.

For example, the driving conditions may be based on measures associated with vibration, angle changes associated with the vehicle, slipping of the tires, and so on. Additionally, sensor information (e.g., image sensors) may be used to ascertain a type of surface on which the vehicle is driving. Thus, if the type of surface is rocky, sandy, and so on, then off-roading conditions may be detected. As another example, the system may use a location of the vehicle to inform presentation of off-roading information. For example, a map may indicate that the vehicle is outside of known roads or is on back-roads known to be associated with off-roading.

Example off-roading information may include a measure of roll associated with the vehicle. For example, the depiction 702A may be illustrated as navigating about the environment 704 as described above with respect to an autonomous visualization. However, for off-roading the depiction 702A may further indicate a measure of roll (e.g., '8 degrees'). This roll may be graphically depicted as illustrated in FIG. 7A. Furthermore, a measure of pitch 702B may be included. In the example of FIG. 7A, the pitch 702B is 14 degrees. Sensors in the vehicle may be used to inform these measured angles.

On a driver side of the user interface 700, video or images from image sensors 706 are included. The user of the user interface 700 may have selected an icon which caused presentation of the images or video. Advantageously, the images or video may be presented without occluding the driving view. As illustrated, information associated with rock climbing and/or drivetrain may be presented.

Figure 7B:
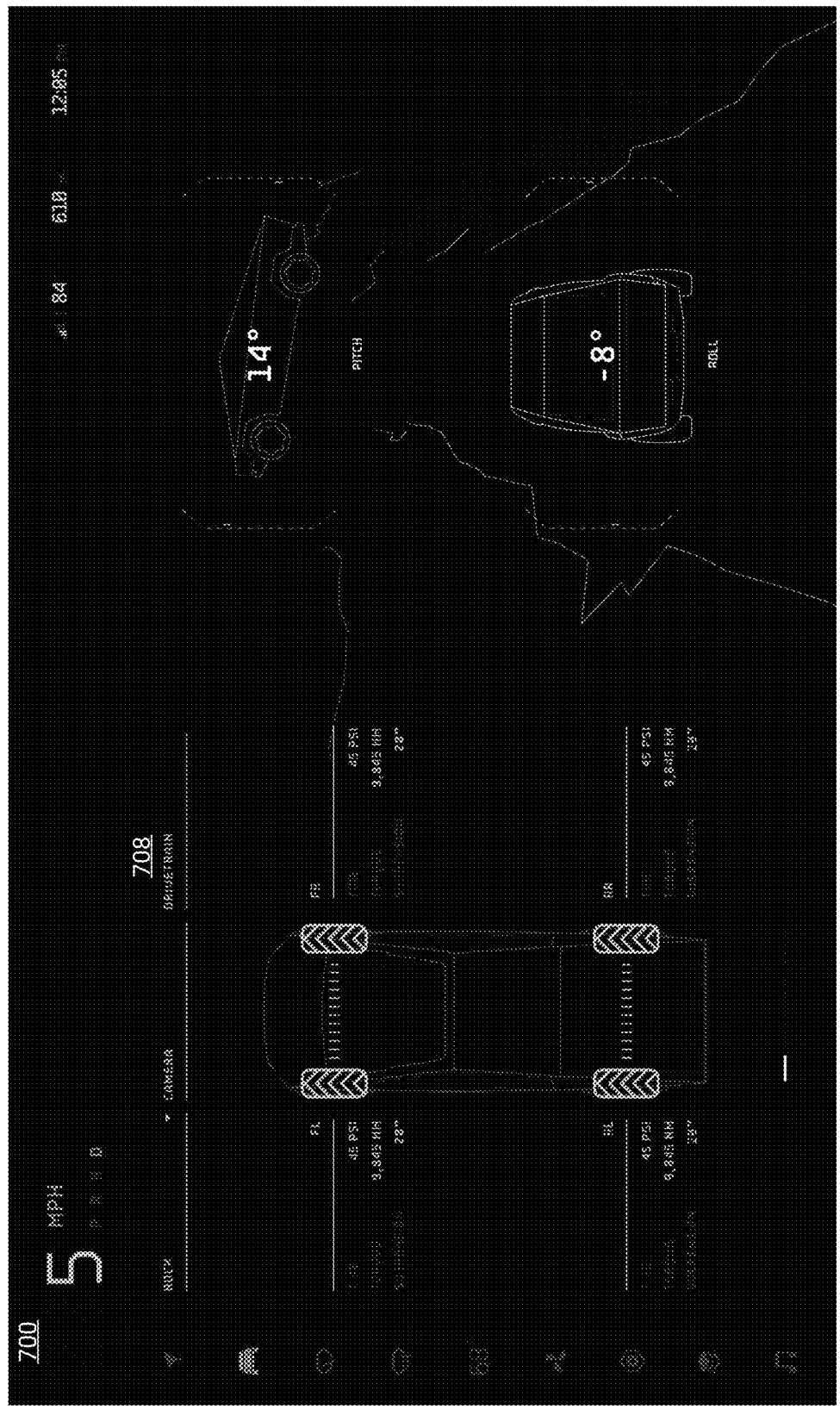
FIG. 7B illustrates an example user interface of a driving view while driving the vehicle in an "off-road" environment and also presenting drivetrain information.

FIG. 7B illustrates the example user interface 700 presenting drivetrain information 708. For example, information associated with tire pressure, torque, suspension, and so on, for each wheel is included.

Figure 8A:
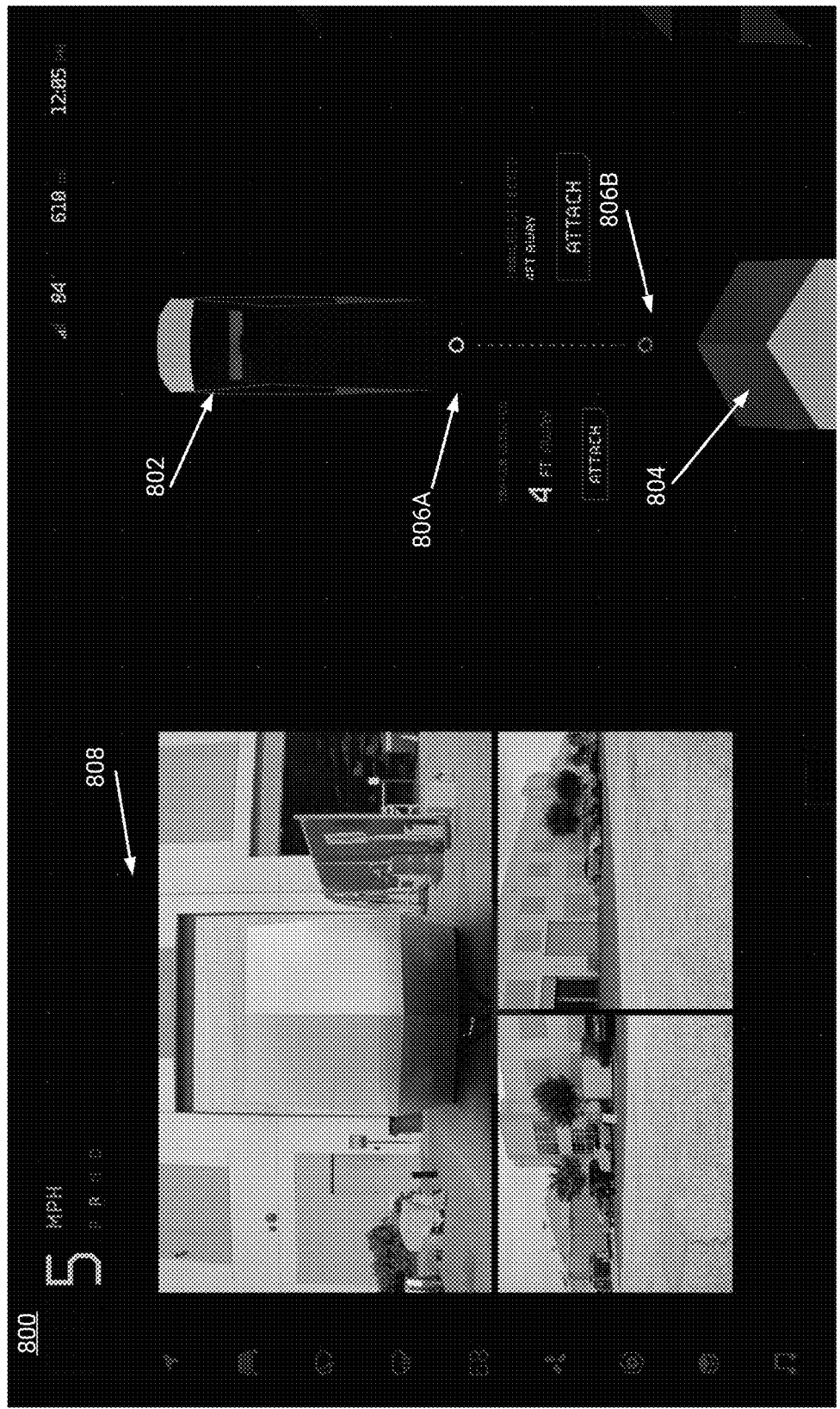
FIG. 8A illustrates an example user interface for a vehicle that is towing a truck trailer.

FIG. 8A illustrates an example user interface 800 for a truck trailer. A vehicle, as described herein, may be a truck. Advantageously, the unified user interface may present information relevant to towing a truck trailer. For example, the information may be presented based on a user selecting a tow mode via the user interface 800. The information may also be presented based on cameras or sensors in the truck detecting that a truck trailer is proximate (e.g., behind the truck). The information may also be presented based on a truck trailer providing wireless communications to the vehicle. Thus, contextual information may indicate that the truck is going to tow, or otherwise connect with, the trailer.

In the illustrated example, an autonomous visualization included. For example, a graphical depiction 802 of the vehicle is included. Due to a current context being associated with attaching a trailer, the depiction 802 is presented as a top-down view of the vehicle. A representation of the trailer 804 is further included. This representation of the trailer 804 may be generated using cameras and/or sensors. For example, a model may be generated based on a view of the trailer. Optionally, the user interface 800 may provide a pre-rendered version of a trailer. For example, a system (e.g., the system 100) included in the vehicle may have a model of the trailer stored. Thus, the user interface 800 may reflect a position of the trailer 804.

The user interface 800 further includes attachment points 806A-806B for the vehicle and trailer. In some embodiments, the user of the user interface 800 may back up and line up these attachment points 806A-806B. In some embodiments, the vehicle may be self-driving and may automatically back up. As illustrated, the trailer may be automatically detected (e.g., 'TRAILER DETECTED') and also indicate a distance between the vehicle and trailer (e.g., '4 FT AWAY'). The distance may be determined via radar, ultrasound, and/or an image sensor. In some embodiments, a user of the user interface may select the 'ATTACH' selectable object to initiate, or otherwise cause, attachment.

Images or videos from cameras 808 are also included in the user interface 800. These may be presented based on user input of an icon included in the user interface 800. These may also be presented while the vehicle is towing, or about to tow, a trailer.

Figure 8B:
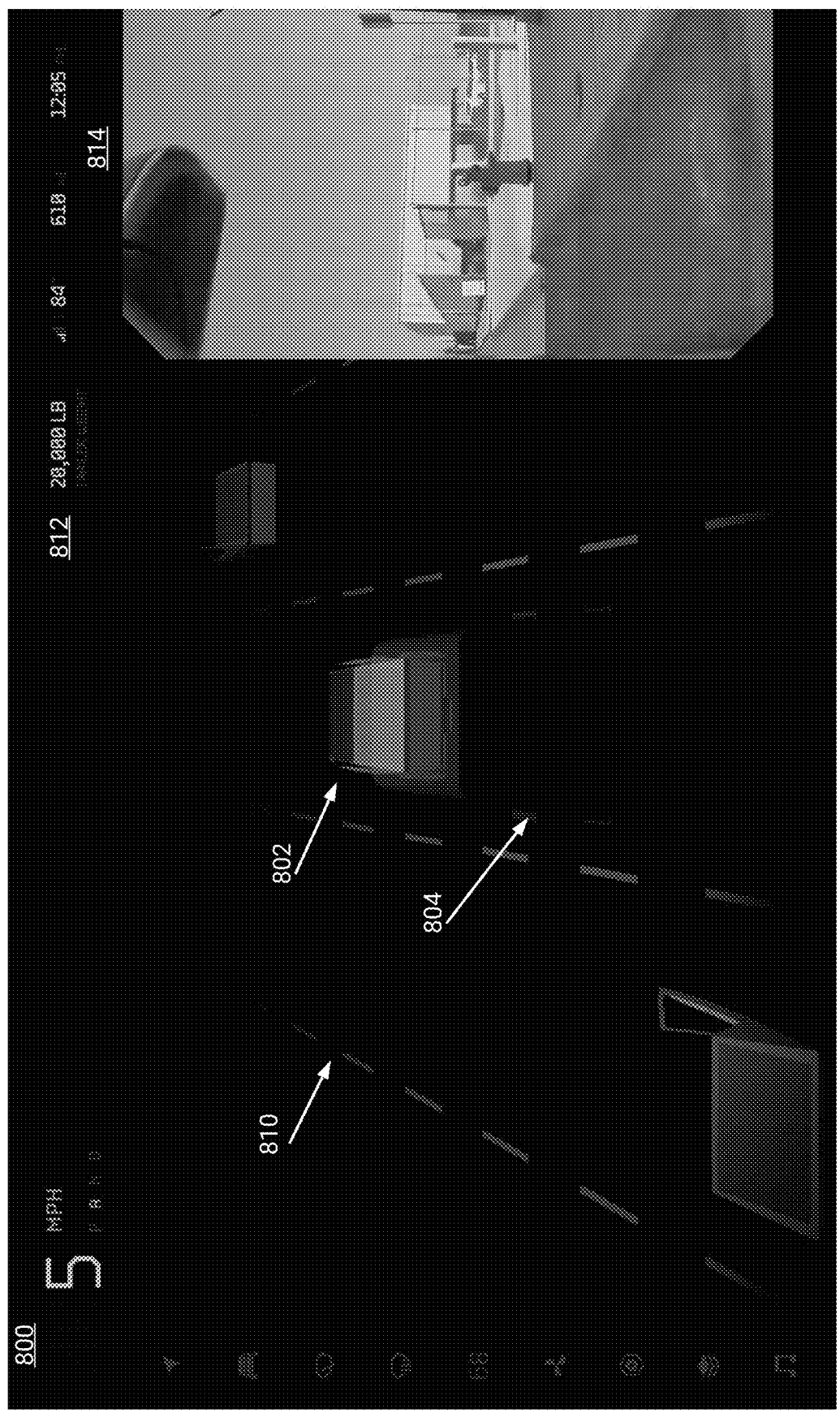
FIG. 8B illustrates the example user interface of a driving view of a vehicle when towing a trailer.

FIG. 8B illustrates the example user interface 800 including a driving view for towing a trailer. As described herein, contextual information may indicate that the trailer is attached to the vehicle and that the vehicle is being driven. In the illustrated example, an autonomous visualization is included. The visualization includes a graphical depiction 802 of the vehicle along with the trailer 804. This depiction may be adjusted in real-time. For example, cameras and/or sensors in the vehicle may monitor the trailer. Thus, any rolling, jostling, sliding, and so on, may be presented in the user interface 800. In some embodiments, the trailer may include sensors and/or cameras usable to monitor its state. This may be received and used to inform rendering of the trailer 804 and/or an environment. For example, an image sensor at a rear of the trailer may be used to identify vehicles and/or objects which are behind the trailer.

In this example, an environment 810 of a highway is rendered. For examples, lanes of the highway along with other vehicles are included. A size of the trailer may, in some embodiments, be known such that a driver may rely upon the user interface 800 to view proximity to other vehicles and/or objects.

Camera information from an image sensor 814 is additionally included in the user interface 800 for ease of viewing. As described herein, this camera information may be offset from the driving view of the vehicle 802 and environment 810. Towing information 812 is additionally included, such as trailer weight, and so on.

Figure 9:
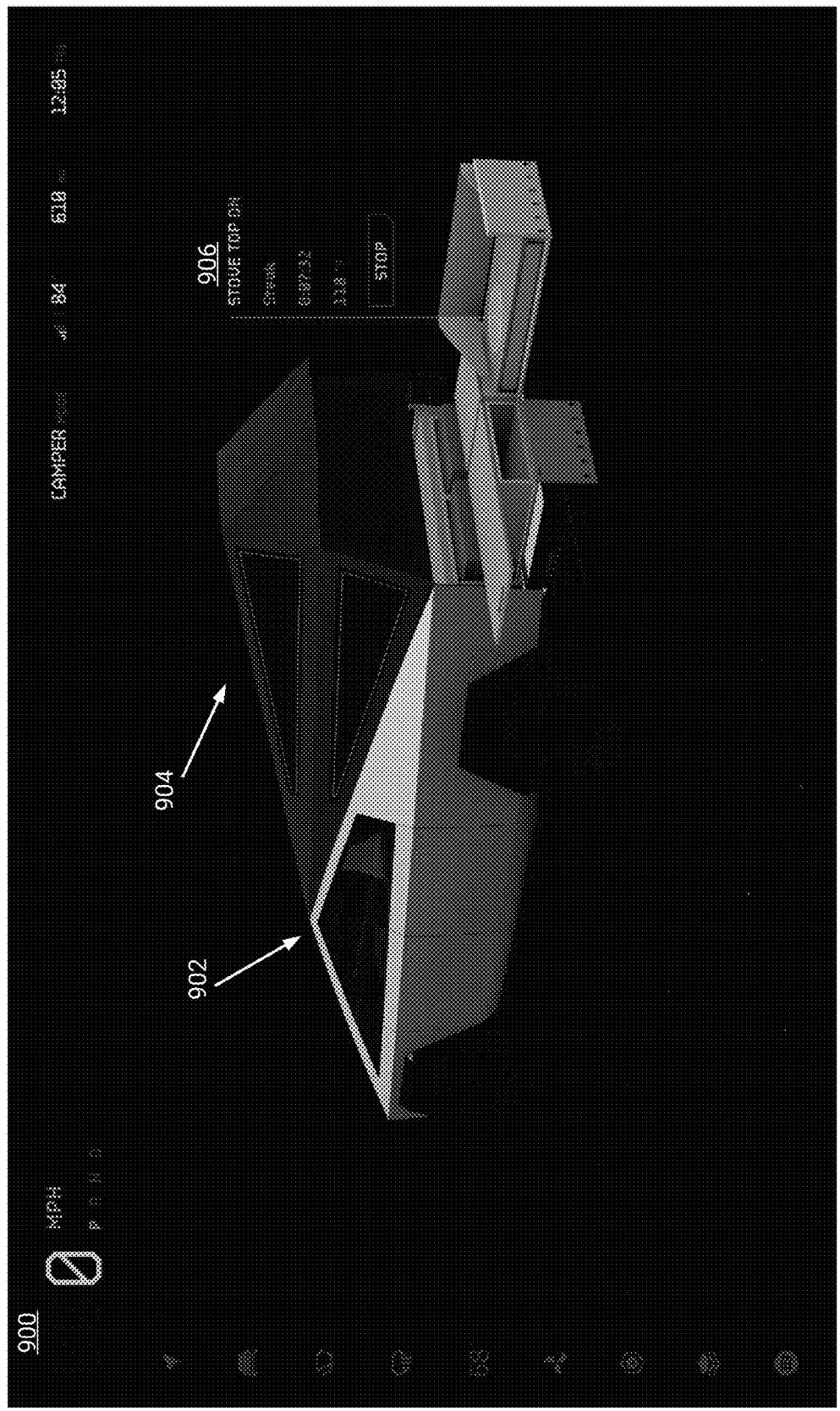
FIG. 9 illustrates an example user interface of a vehicle while in a camper mode.

FIG. 9 illustrates an example user interface 900 for a camper mode. In some embodiments, a vehicle may be placed in a camper mode. Thus, contextual information may reflect the camper mode. The unified user interface described herein may updated to reflect a graphical depiction of the vehicle 902 along with a graphical depiction of a camper 904. Additionally, attachments to the vehicle may be graphically illustrated. In some embodiments, these attachments may be automatically detected by a system included in the vehicle. For example, they may be detected using cameras on the vehicle. The attachments may also provide wireless information identifying their function or use.

In the example of FIG. 9, an example attachment is a stove top 906. Via the user interface 900, a user may control aspects of the stove top 906. For example, the user may indicate initiation of a food item being cooked. As another example, the user may specify a temperature or measure associated with heat (e.g., high heat, medium heat, and so on). The control information may be routed to the stove top 906 via wired or wireless communications.

Figure 10A:
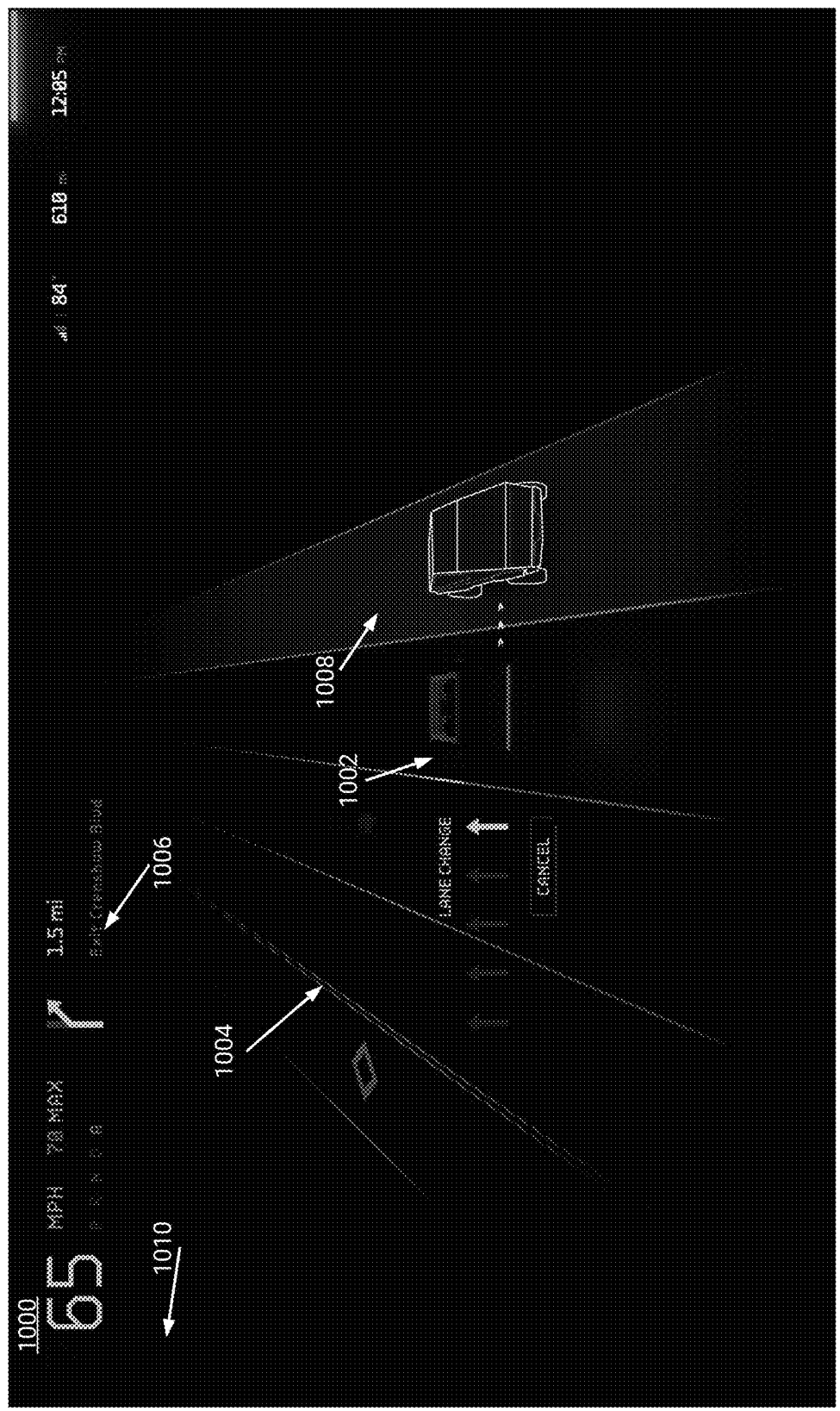
FIG. 10A illustrates an example user interface of a driving view for navigation of a vehicle.

FIG. 10A illustrates an example user interface 1000 for navigation of a vehicle. In the example, contextual information may indicate that the vehicle is navigating towards a location. The example user interface 1000 may be used by a user to follow navigation directions to a location. This user interface 1000 may also be presented while a vehicle is in an autonomous or semi-autonomous mode (e.g., self-driving mode).

An autonomous visualization (e.g., graphical depiction 1002 of a vehicle and an environment 1004 of a highway) is included in the user interface 1000. As illustrated the environment 1004 indicates a carpool lane, double lines, other vehicles, and so on. Furthermore, map information is included in the user interface. As an example, the map information may inform street names (e.g., 'Crenshaw Blvd' 1006), directionality of lane lines, and so on. This combined view of the autonomous visualization and map information may represent a driving mode as described above.

Information 1006 indicating a next turn which the vehicle is to make is included in the user interface 1000. As described at least in FIGS. 1A-1B, during navigation the unified user interface may optionally present a combined view which indicates navigation events. Thus, the combined view may indicate a next turn which the vehicle is to make. For complicated turns, the environment 1004 may optionally zoom out to illustrate more of a top down view as described in FIG. 2B.

Since the navigation techniques may rely upon sensors and/or cameras, a system included in the vehicle may have precise knowledge of the vehicle's location. For example, the system may identify a precise lane in which the vehicle is driving. Thus, the user interface 1000 may indicate that the vehicle should move over into a next lane 1008. As illustrated, the user interface 1000 illustrates (e.g., animates) the vehicle moving to the next lane 1008. Similarly, the user interface 1000 may indicate the existence of other vehicles. Thus, if there is a vehicle in the next lane 1008, the user interface 1000 may indicate that the vehicle should wait until it is safe to move. For a self-driving mode, the highlighted next lane 1008 may be used to inform the user that the vehicle is switching lanes or about to switch lanes.

As described above, the user may interact with icons 1010 to present a menu or user interface associated with vehicle functionality. Upon selection of an icon, the combined view of the vehicle 1002 and environment 1004 may be reduced in size.

Additionally, when in the driving mode the user may cause zooming out of the combined view. For example, the user may use pinch-to-zoom techniques to cause the combined view to zoom out. The zoomed out combined view may thus reflect a greater map area. For example, additional streets, highways, and so on, may be reflected in the user interface. Additionally, the zoomed out combined view may reduce a size of the graphical depiction 1002 of the vehicle. Vehicles and/or objects which are proximate to the vehicle may be included in the zoomed out combined view. For example, if the user zooms out slightly a different vehicle may be rendered which is not close enough to be visible in the combined view of FIG. 10A. Furthermore, the zoomed out view may highlight a larger portion of a route to the location.

Figure 10B:
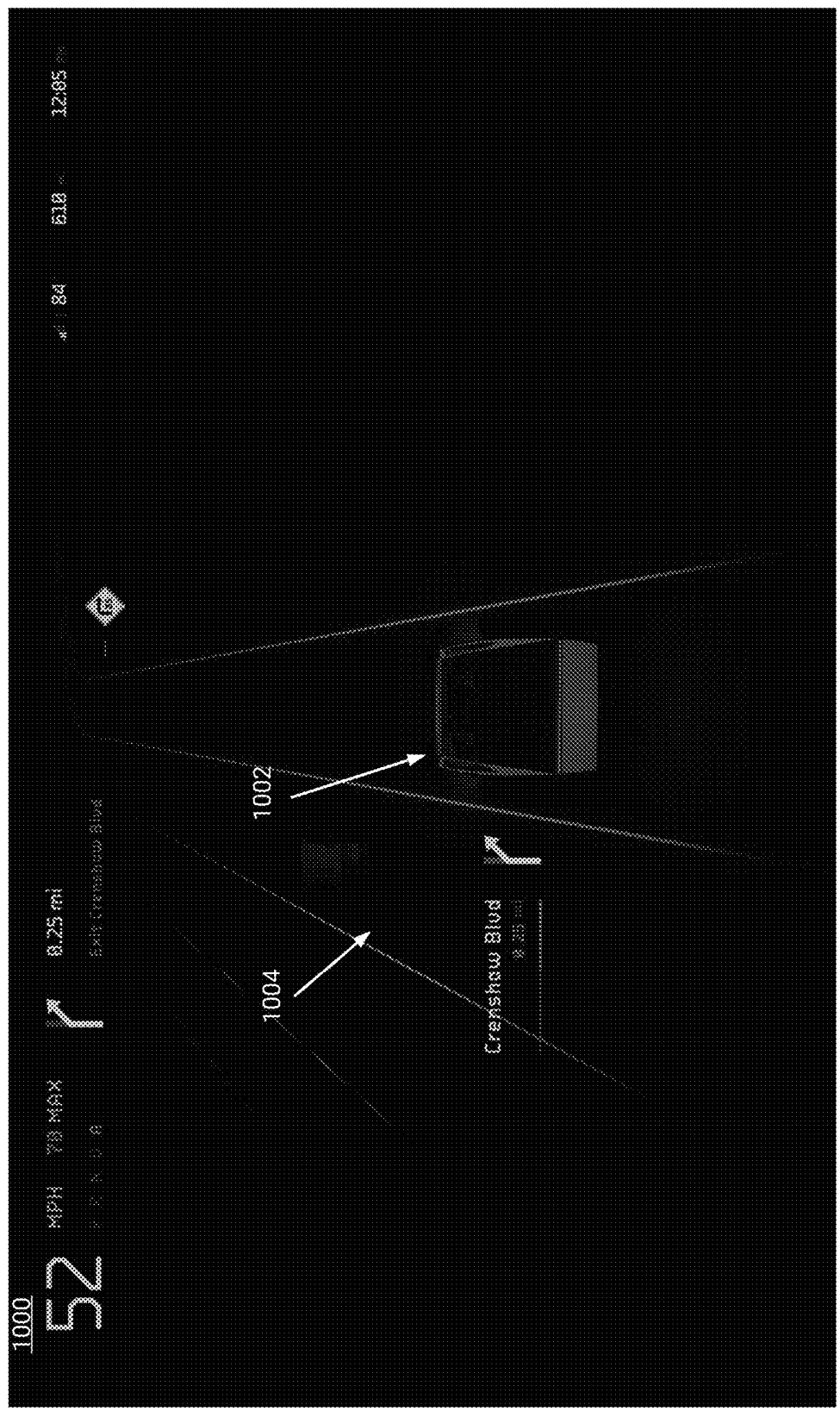
FIG. 10B illustrates another example user interface of the driving view.

FIG. 10B illustrates another example user interface 1000 for navigation of a vehicle. In the illustrated example, the vehicle has moved into the next lane 1008 illustrated in FIG. 10A. The user interface 1000 has then updated to reflect that the vehicle is to exit from this lane.

Figure 10C:
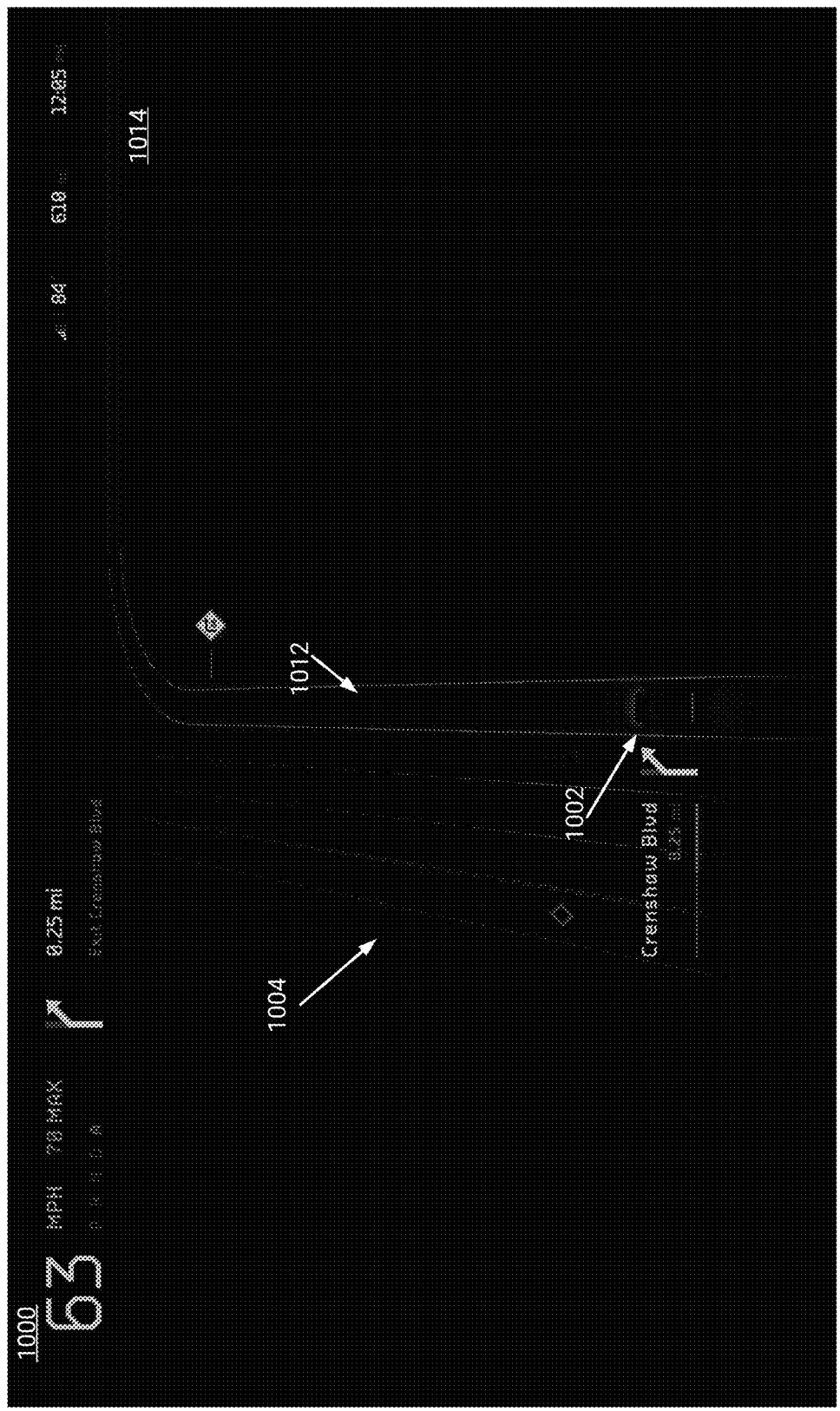
FIG. 10C illustrates another example user interface of the driving view.

FIG. 10C illustrates another example user interface 1000 for navigation of a vehicle. In the illustrated example, the vehicle is approaching the next turn (e.g., the exit). In some embodiments, an icon indicating movement may be presented. As another example, lane 1012 is highlighted and indicates the curving path the vehicle is to follow. The user interface 1000 may advantageously zoom out to show more of the path (e.g., the curve portion 1014 on the upper right) such that the driver may rapidly follow the navigation. In some embodiments, upon exiting, the user interface 1000 may zoom out partially to illustrate more of a top down view.

Optionally, the user interface 1000 may zoom out depending on a complexity of an upcoming series of turns. Techniques for zooming out are described above, with respect to FIG. 2B.

Figure 11A:
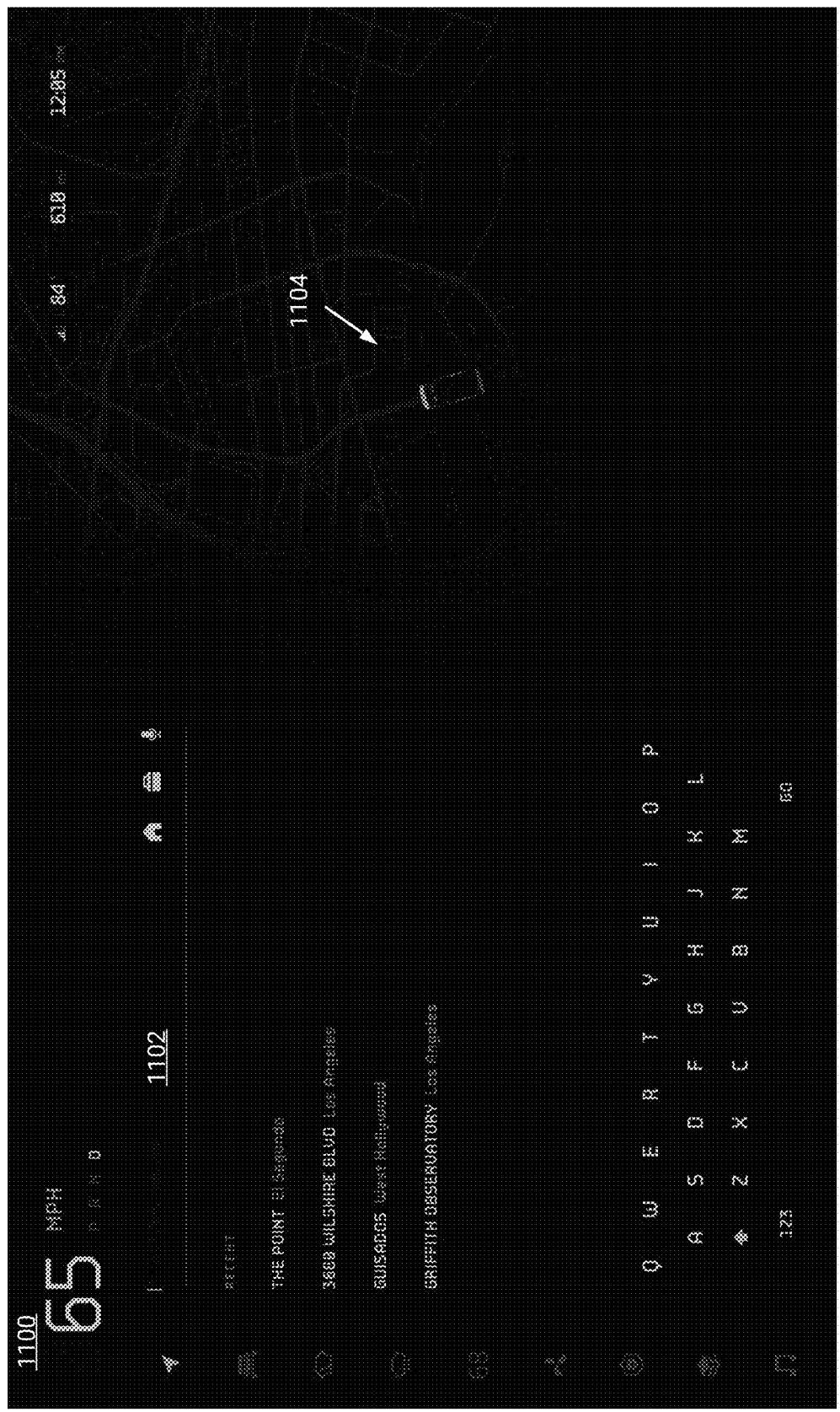
FIGS. 11A-11C illustrate user interfaces for selecting navigation information.
Figure 11B:
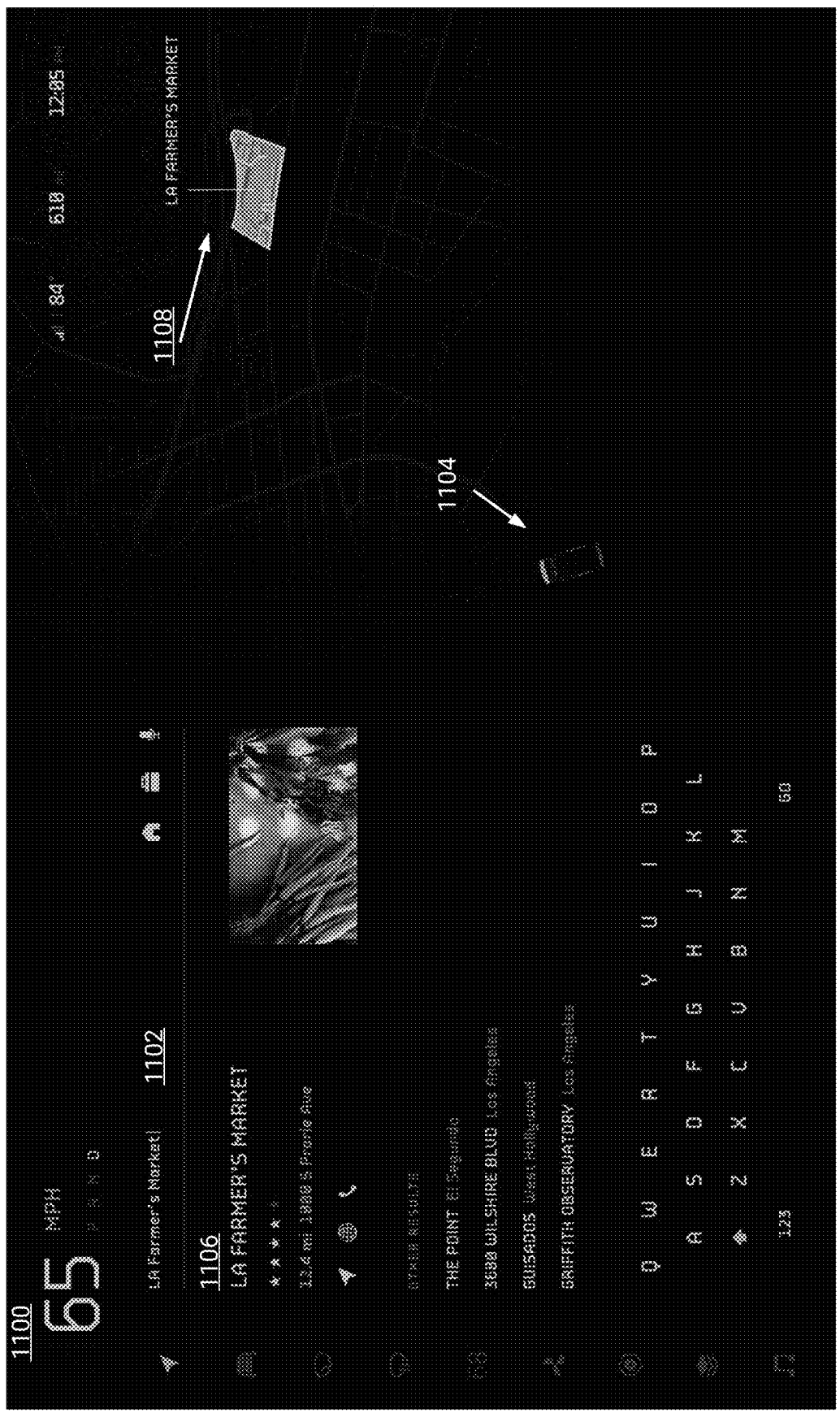
Figure 11C:
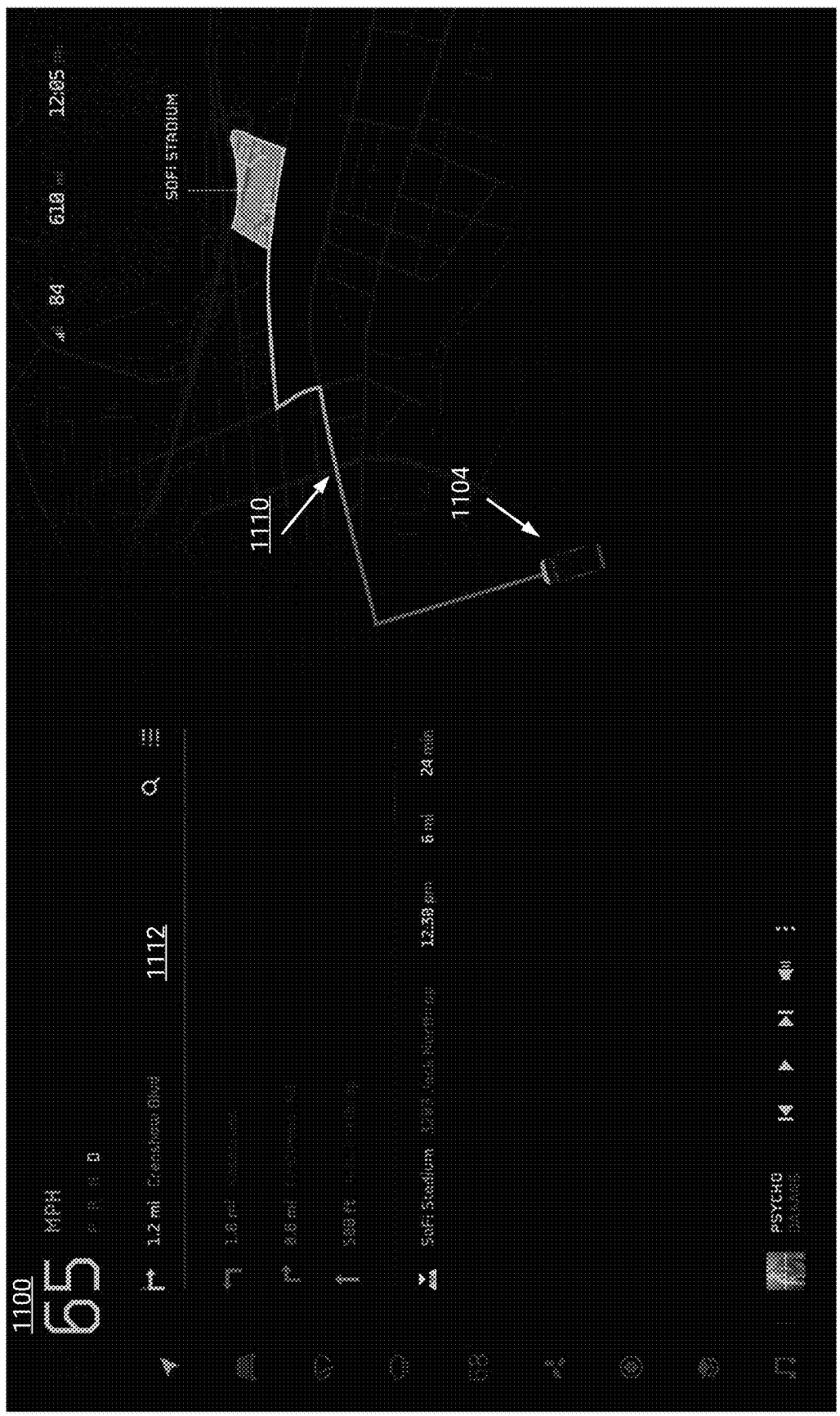

FIGS. 11A-11C illustrate user interfaces 1100 for selecting navigation information. As illustrated in FIG. 11A, a user may search for a location via a navigation user interface 1102. Thus contextual information may reflect that the user intends to navigate. A combined view of an autonomous visualization 1104 and map information is additionally included in the user interface 1100, FIG. 11B illustrates selection of a location via the navigation user interface 1102. Summary information 1106 for the location may be presented in the user interface 1100. Additionally, the combined view 1104 may zoom out to present a graphical depiction 1108 of the location. In this way, the user may view a location of his/her vehicle along with selected location.

FIG. 11C illustrates a route 1110 to the location. In some embodiments, an overview of directions 1112 may be included in the user interface 1100. Optionally, this overview may be included while the vehicle is in a park mode or for a threshold time after selection of the location. Subsequently, the combined view 1104 may zoom in to depict a driving view as described herein. For example, a seamless animation of zooming in may be included in the user interface. In this example, the animation may reflect a render or virtual camera adjusting position from the top perspective to a closer rear view (e.g., as illustrated in FIG. 10A).

Facial Recognition and Passenger Tracking

As described above, in some embodiments a system included in a vehicle may identify which vehicle passenger (e.g., driver, side-passenger) is going to provide user input to a display. For example, the system may be the contextual user interface system 100. Based on this identification, a unified user interface presented on the display may be updated. For example, icons may be switched between a left and right side of the display. As will be described below, the system may adjust other aspects of operation of the vehicle based on passenger tracking. As an example, the system may use facial recognition techniques to learn vehicle passengers. Preferred settings and/or profile information for passengers may thus be learned by the system. As another example, the system may adjust mirrors, air conditioning, the steering wheel, and so on, based on detected positions of passengers.

Figure 12:
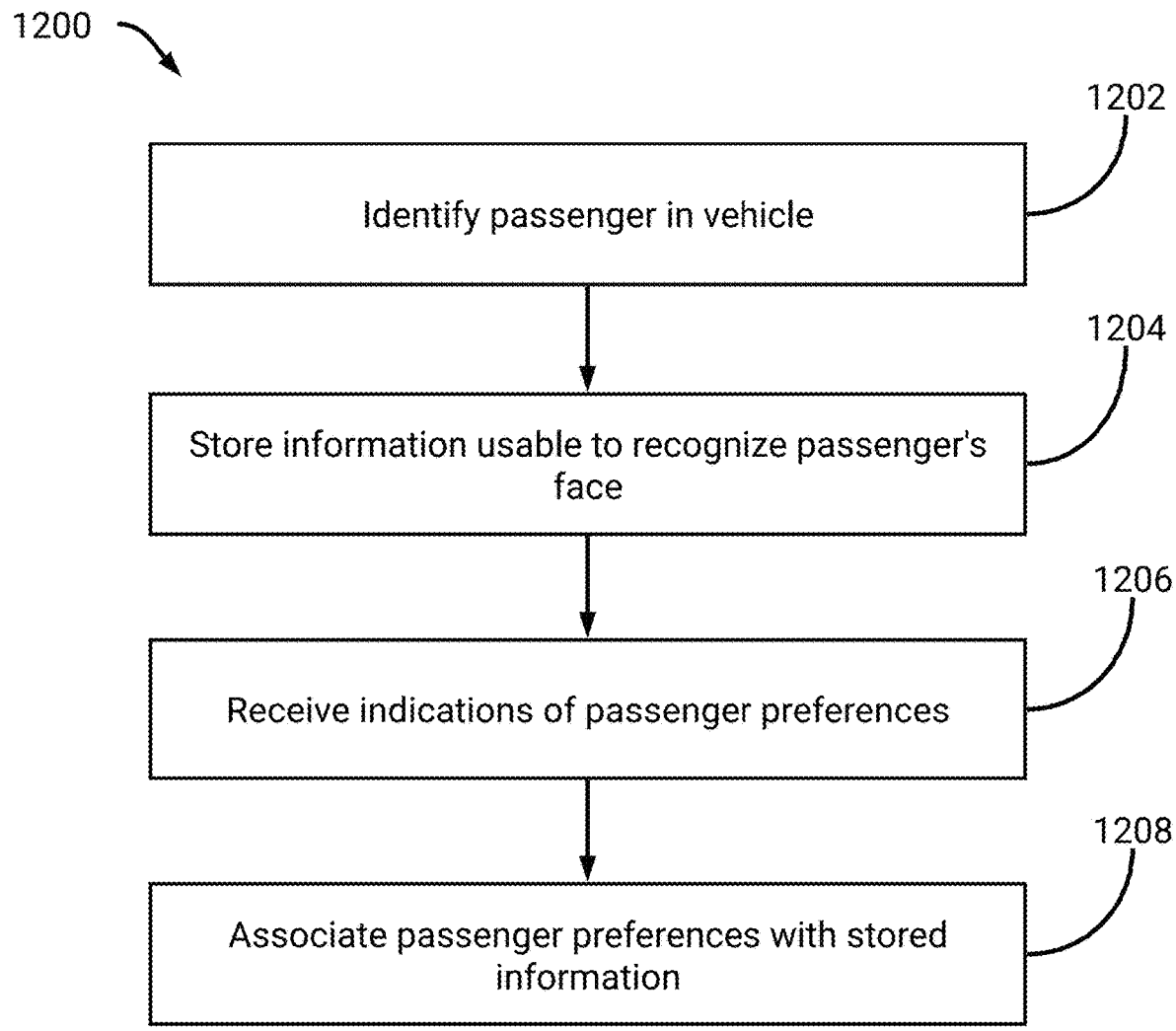
FIG. 12 is a flowchart of an example process for associating passenger preference information with particular passengers.

FIG. 12 is a flowchart of an example process 1200 for associating passenger preference information with passengers. For convenience, the process 1200 will be described as being performed by a system of one or more computers (e.g., the contextual user interface system 100).

At block 1202, the system identifies a passenger in a vehicle. The system may use cameras and/or sensors to identify that a passenger has entered the vehicle. For example, the sensors may represent infrared emitters or projectors. In this example, if the beams are interrupted the system may identify that a passenger is seated. As another example, machine learning techniques may be used to identify a person based on images. For example, convolutional neural networks may be leveraged. As another example, the system may identify a passenger upon opening of a vehicle door and/or upon seat weight sensors indicating a passenger is on a seat.

At block 1204, the system stores information usable to recognize the passenger's face. The system may use deep learning techniques. For example, the system may obtain images of the passenger's face using one or more cameras positioned in the vehicle or outside the vehicle (e.g., the images may be taken as the passenger enters the vehicle). The system may then use a deep learning model to encode the passenger's face in an example face space previously learned by the model. Thus, only a limited number of images of the face may be used to uniquely identify the passenger.

At block 1206, the system receives indications of preferences of the passenger. The passenger may adjust mirrors, seat positions, air conditioning, music preferences, and so on. These preferences, or a portion thereof, may be stored by the system.

At block 1208, the system associates the passenger preferences with the passenger. The system may store the preferences such that when the passenger enters the vehicle at a subsequent time, the preferences may be utilized.

In all situations in which facial recognition techniques are used, it is to be understood that these may be opt-in. Additionally, stored information may be stored locally to the vehicles and may encrypted.

Figure 13A:
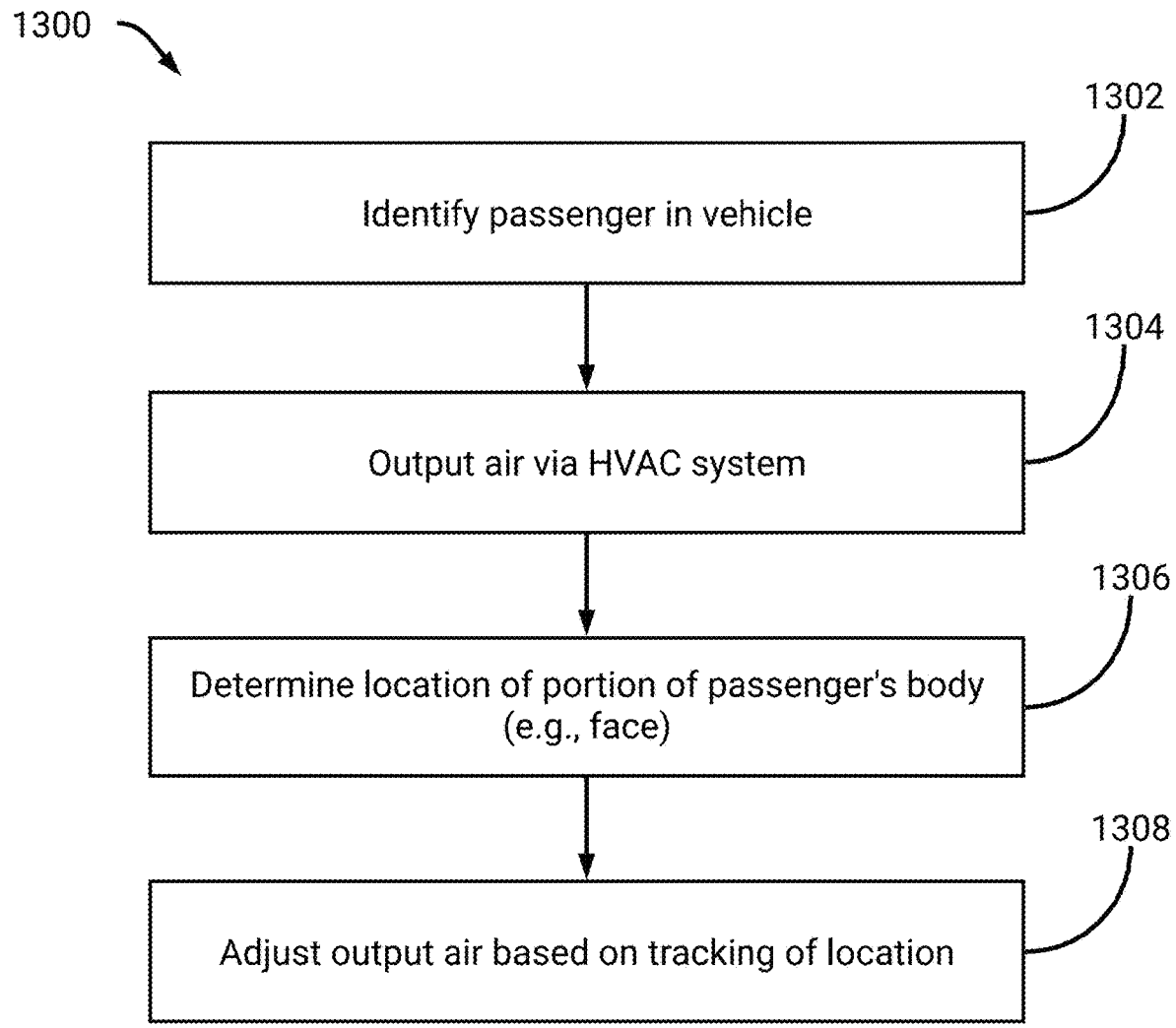
FIG. 13A is a flowchart of an example process for adjusting air conditioning based on passenger tracking.

FIG. 13A is a flowchart of an example process 1300 for adjusting air conditioning based on passenger tracking. For convenience, the process 1300 will be described as being performed by a system of one or more computers (e.g., the contextual user interface system 100).

At block 1302, the system identifies a passenger of a vehicle as described in FIG. 12. At block 1304, the system outputs air via a heating, ventilation, and air conditioning (HVAC) system. For example, the system may output air conditioning via a stream of air from an HVAC system in the vehicle. The HVAC system may additionally include another stream which usable to change a height associated with the stream of air (e.g., a vertical axis). Additionally, the HVAC system may adjust the stream of air along a horizontal axis. Additional description related to an HVAC system which can adjust a horizontal and vertical output of air is included in U.S. Pat. No. 15,060,590, which is hereby incorporated by reference herein in its entirety.

At block 1306, the system determines a location of a portion of the passenger's body based on images or video of the passenger. For example, the portion may represent a face of the passenger. In some embodiments, the system may have facial recognition information stored for the passenger. In some embodiments, the system may determine the face without facial recognition techniques. For example, the system may use a deep learning model, or other machine learning model, usable to segment the face from images of the passenger.

At block 1308, the system adjusts output of air based on tracking the location. As the passenger moves about in his/her seat, for example slumping down/sitting up/rotating his/her head/and so on, the system may adjust the air to focus on the location. In this way, the air being continuously provided to the passenger's face. In some embodiments, the system may direct air at the passenger's face if an internal temperature of the inside is greater than a threshold. In some embodiments, the system may direct air if an external temperature is high and the passenger entered the vehicle within a prior threshold amount of time. In this way, the system may cause a cooling of the passenger. In some embodiments, thermal sensors or cameras may be used to monitor a temperature of the passenger. If the passenger's face is hot, such as from running or being outside in hot air, the system may ensure air is provided to the passenger's face.

Optionally, the system may output air to avoid the passenger's face. For example, after a threshold amount of time of air hitting the passenger's face, the system may cause it to be directed to a body of the passenger. As another example, the system may identify when an internal temperature is below a threshold and then cause the air to be directed to the body.

Optionally, the passenger may indicate whether he/she prefers the air to track his/her face, body, or to perform no tracking.

Figure 13B:
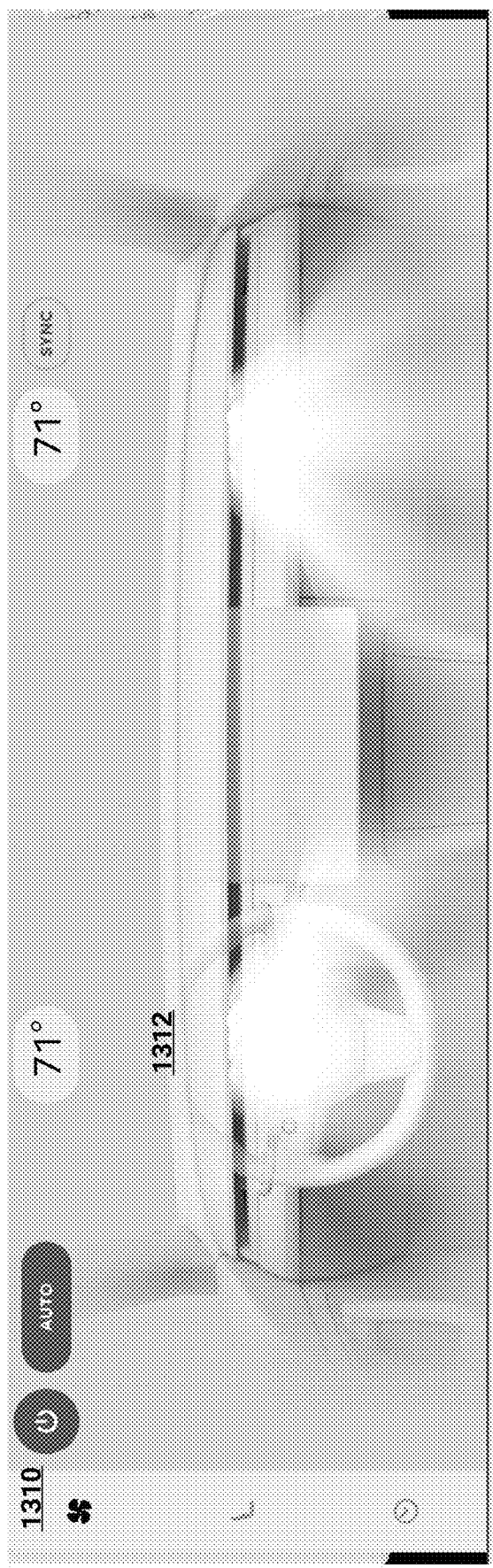
FIGS. 13B-13D illustrate example user interfaces of air conditioning tracking a passenger.
Figure 13C:
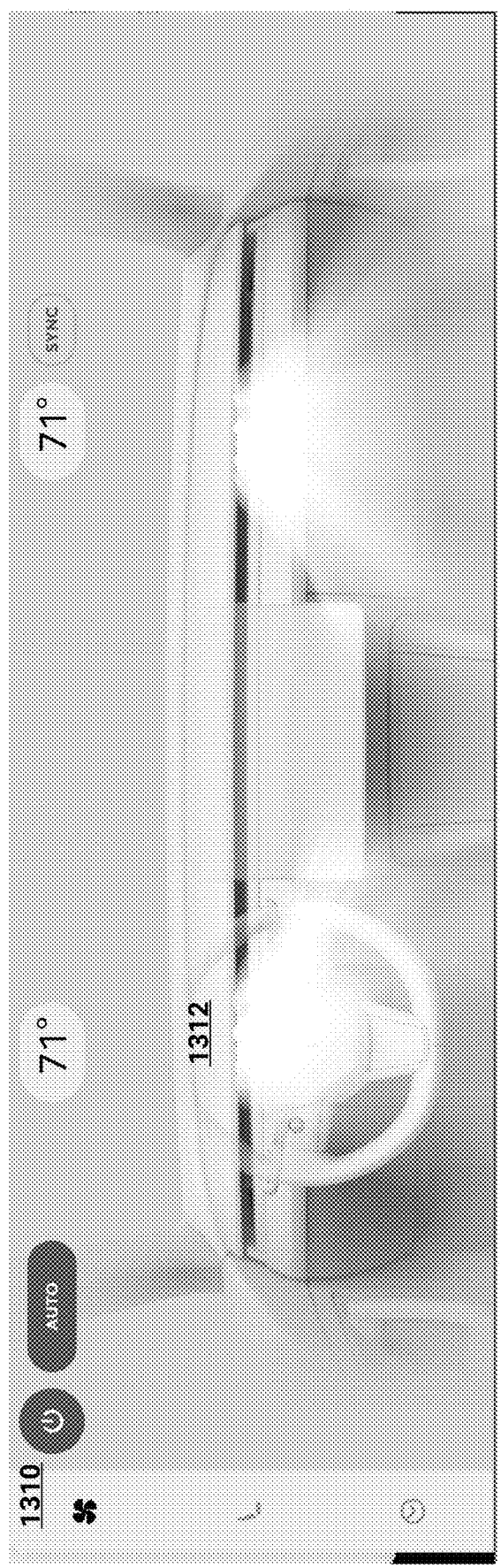
Figure 13D:
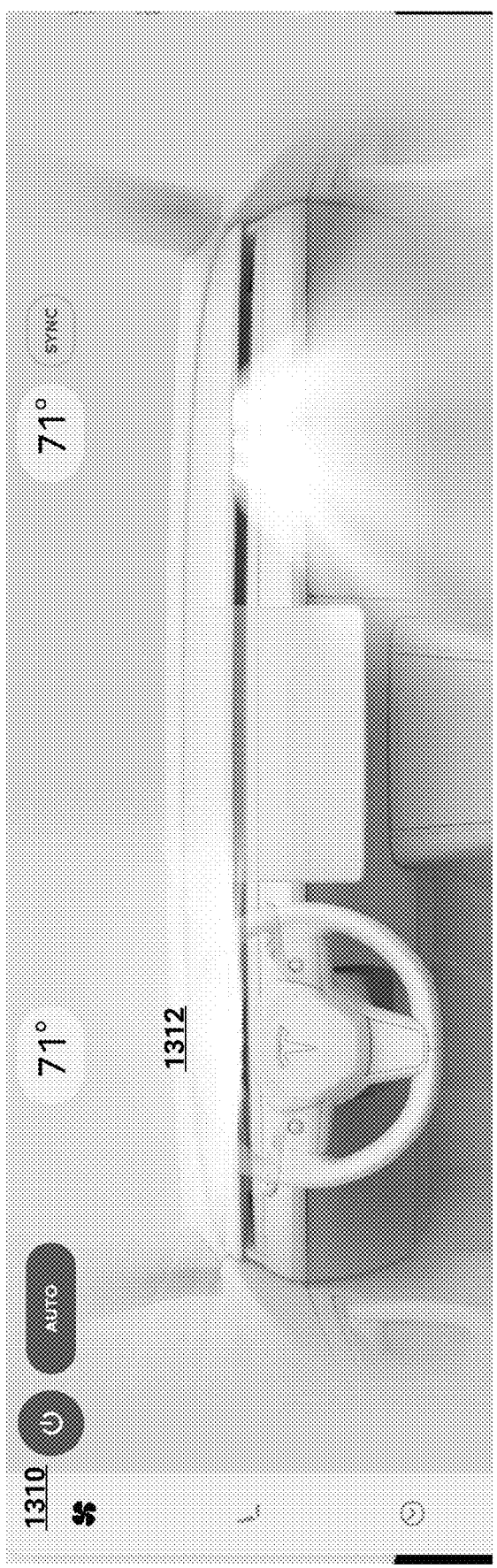

FIGS. 13B-D illustrate example user interfaces of air conditioning tracking a passenger. As illustrated in these user interfaces, an air stream 1310 is being adjusted. The user interface, such as the unified user interface described herein, may present this real-time adjustment of air. For example, the adjustment may be presented in an air conditioning control user interface positioned proximate to a combined view of a depiction of a vehicle and map information.

Figure 14:
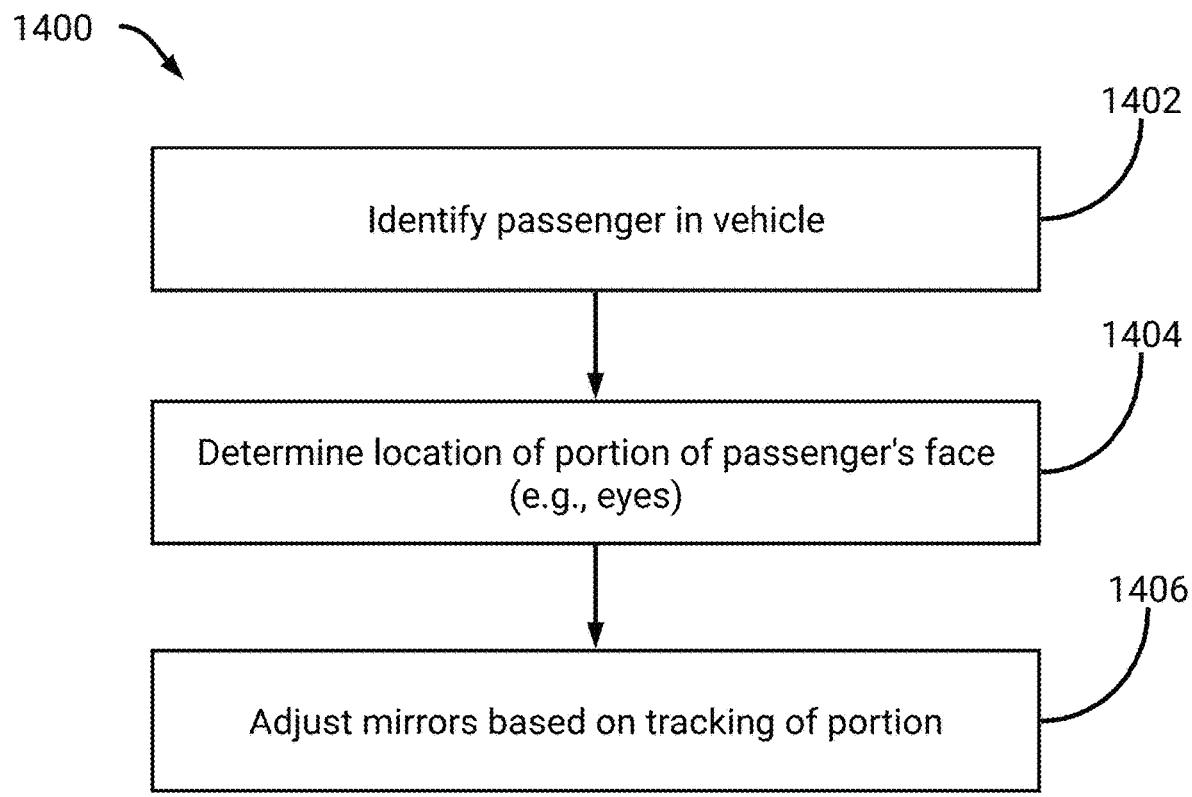
FIG. 14 is a flowchart of an example process for adjusting mirrors based on passenger eye tracking.

FIG. 14 is a flowchart of an example process 1400 for adjusting mirrors based on passenger tracking. For convenience, the process 1400 will be described as being performed by a system of one or more computers (e.g., the contextual user interface system 100).

At block 1402, the system identifies a passenger in a vehicle. At block 1404, determines location of a portion of a passenger's face based on images or video of the passenger. For example, the system determine a location of the passenger's eyes. In some embodiments, the system may determine a height of the eyes, horizontal position of the eyes (e.g., X, Y, Z, coordinates), closeness of the eyes, and so on. In some embodiments, the system may determine vectors extending from each eye to inform locations at which the eyes are verging.

At block 1408, the system adjusts mirrors based on tracking the portion. The system may adjust side mirrors, a rear view mirror, and so on, based on position information of the passenger's eyes. For example, the system may adjust a side mirror to ensure that the passenger's eyes have a substantially optimal view using the side mirror. Similarly, the system may adjust the rear view mirror as the passengers moves his/her head about to ensure a consistent rear view image is provided to the passenger.

In some embodiments, a user interface may be presented which recommends that the passenger adjust his/her position to better see the mirrors. For example, the passenger's seat may be in a position which is disadvantageous for mirror viewing. As another example, the passenger may be too short or too tall for good mirror viewing at a certain seat position. In some embodiments, the system may automatically adjust a seat (e.g., raise the seat, lower the seat, and so on).

In addition to the adjusting air conditioning and mirrors, the system may also adjust a steering wheel. For example, the system may adjust a steering wheel based on a height of a passenger. The height may be informed based on a height of the passenger's face or another portion of the passenger's body (e.g., arms, torso, and so on). Thus, using images and/or video of the passenger the system may automatically adjust the steering wheel.

In some embodiments, the system may use images or video of an interior of a vehicle to determine whether any animals are present. For example, the system may trigger a dog mode automatically upon identifying that a dog, or other animal, is present in the vehicle when humans have left the vehicle. In some embodiments, the system may use facial tracking or eye tracking to ensure that a driver is monitoring the road when self-driving technology is engaged.

Other Embodiments

Example embodiments may include methods, systems, and non-transitory computer storage media. An example method is implemented by a system of one or more processors, the system being included in a vehicle, and the method comprising: causing presentation, via a display of the vehicle, of a unified user interface comprising a combined view which aggregates an autonomous visualization and map information, the autonomous visualization and map information being associated with a zoom level, wherein the unified user interface is generated based on first contextual information indicative of operation of the vehicle; accessing second contextual information indicative of subsequent operation of the vehicle; and updating the unified user interface based on the second contextual information, wherein the combined view is adjusted, and wherein adjusting the combined view comprises adjusting a size of the combined view in the unified user interface or adjusting the zoom level.

The above embodiments may include one or more of the following. The autonomous visualization includes a graphical depiction of the vehicle. The autonomous visualization includes a graphical depiction of the vehicle and a graphical representation of a real-world environment in which the vehicle is located. The graphical representation of the real-world environment comprises one or graphical depictions of other vehicles which are proximate to the vehicle. The graphical representation of the real-world environment comprises graphical depictions of other vehicles and graphical representations of one or more objects which are proximate to the vehicle. An object includes a road marking, a stop sign, a signal light, a pedestrian, a trash can, or a road sign. The combined view includes a graphical representation of one or more lanes of a road on which the vehicle is located, a graphical depiction of the vehicle positioned in a particular lane of the one or more lanes, and map information comprising a graphical representation of a map associated with the road, wherein the graphical depiction of the vehicle is depicted as being on the map. The combined view represents a rendered view of a real-world environment in which a render or virtual camera is positioned a threshold distance above a rear of the vehicle. The combined view represents a driving view, and wherein the graphical depiction of the vehicle is animated as driving in the particular lane. The map indicates a name of the road. The map indicates a different name of a different road proximate to the road. The embodiments further include receiving user input associated with updating the zoom level associated with the combined view; identifying a portion of the map information based on the updated zoom level; and updating the combined view, wherein the combined view includes a graphical representation of the portion of the map information. Updating the combined view comprises re-sizing the autonomous visualization. The autonomous visualization comprises a graphical depiction of the vehicle, and wherein the graphical depiction is reduced in size based on the updated zoom level. The first contextual information indicates that the vehicle is in park, and wherein the second contextual information is associated with control of vehicle functionality via the unified user interface. Control of vehicle functionality comprises control of a heating, ventilation, and air conditioning, system, or control of a music application, or control of a navigation user interface. The unified user interface includes a plurality of icons associated with respective vehicle functionality, wherein updating the unified user interface comprises: updating the unified user interface to include a menu associated with a selected icon, wherein the menu is included in a first portion of the unified user interface; and re-sizing the combined view, wherein the combined is included in a second portion which is not occluded by the menu. The first contextual information indicates that the vehicle is navigating along a route, wherein the combined view further aggregates the navigation information, and wherein the second contextual information indicates that the vehicle has moved along the route. The route is associated with a plurality of driving events indicated in the navigation information, and wherein updating the unified user interface comprises: identifying a subset of the driving events which are within a threshold distance of a location of the vehicle or within a threshold driving time of the location; determining, based on the identified subset, that the zoom level is to be adjusted. Determining that the zoom level is to be adjusted is based on one or more complexity measures associated with the subset of the driving events. Determining that the zoom level is to be adjusted is based on a number of the identified subset exceeding a threshold. A size of the autonomous visualization is adjusted based on the adjusted zoom level and wherein an area associated with the map information is increased based on the adjusted zoom level. The route is associated with a plurality of driving events indicated in the navigation information, wherein the combined view illustrates a first driving event of the plurality of driving events, and wherein the method further comprises: adjusting the zoom level, wherein the combined view illustrates a plurality of second driving events of the plurality of driving events. The route is associated with a plurality of driving events indicated in the navigation information, and wherein updating the unified user interface comprises: identifying at least one driving event which is within a threshold distance of a location of the vehicle or within a threshold driving time of the location; determining, based on the at least one driving event, that the zoom level is to be adjusted. At least one driving event indicates a transition from a highway to a surface road. The unified user interface is responsive to user input causing adjustment of the zoom level or translation of the map information along a particular direction. Operations further comprise receiving user input causing translation of the map information along a particular direction, the user input comprising a swiping motion to indicate the particular direction; accessing a portion of map information based on the translation of the map information; and updating the combined view to present the portion of map information. Updating the combined view comprises: identifying that a location of the vehicle is not included in the portion of map information; and updating the combined view to include the portion of map information, wherein the autonomous visualization comprises a graphical depiction of the vehicle, and wherein the graphical depiction of the vehicle is not included in the combined view. Updating the combined view comprises: identifying that a location of the vehicle is not included in the portion of map information; adjusting the zoom level, such that a updated portion of map information is identified, wherein the updated portion of map information includes the location; and updating the combined view based on the adjusted zoom level, wherein the autonomous visualization comprises a graphical depiction of the vehicle, and wherein a size of the graphical depiction of the vehicle is reduced in the combined view.

Example embodiments may further include a system comprising one or more processors and non-transitory storage media storing instructions which cause the one or more processors to render a user interface for presentation via a display included in a vehicle, wherein the user interface: presents a combined view which unifies an autonomous visualization and map information, wherein the autonomous visualization comprises a graphical depiction of the vehicle; responds to selection of an icon of a plurality of icons, the icons being associated with control of respective vehicle functionality, wherein in response to selection, the user interface presents an icon user interface; and dynamically adjusts the combined view, such that the icon user interface does not occlude the combined view.

The above embodiments may include one or more of the following. The display is touch-sensitive, and wherein the user interface responds to touch input. The user interface responds to one or more verbal commands. The instructions cause the one or more processors to access contextual information associated with operation of the vehicle, wherein the contextual information indicates the vehicle is in a driving mode, and wherein the autonomous visualization comprises a graphical representation of a real-world environment proximate to the vehicle. The graphical representation of the real-world environment comprises one or graphical depictions of other vehicles which are proximate to the vehicle. The autonomous visualization is updated by the one or more processors at a threshold frequency. To update the autonomous visualization, the instructions cause the one or more processors to: obtain information determined from image sensors positioned about the vehicle, the information reflecting position information regarding other vehicles proximate to the vehicle; access respective models associated with the other vehicles; and render the models for inclusion in the combined view. Control of vehicle functionality comprises control of a heating, ventilation, and air conditioning, system, or control of a music application, or control of a navigation user interface. The instructions cause the one or more processors to access contextual information associated with operation of the vehicle, wherein the contextual information indicates the vehicle is in a navigation mode, wherein the combined view further unifies navigation information, wherein, for the combined view, the autonomous visualization comprises: a graphical representation of a real-world environment proximate to the vehicle, wherein, for the combined, view the navigation information comprise: one or more graphical representations of respective driving events which are within a threshold distance or driving time of a location of the vehicle, and wherein, for the combined view, the map information comprises a graphical representation of a portion of a map associated with the location of the vehicle. A particular driving event comprises exiting a highway, and wherein the graphical representation of the particular driving event comprises an indication of a number of lanes over which the vehicle is to move. The graphical representation of the particular driving event comprises an animation of the graphical depiction of the vehicle moving over the number of lanes. A zoom level associated with the combined view is increased based on the particular driving event. A size of the graphical depiction of the vehicle is reduced based on the zoom based on the zoom level, and wherein the portion of the map is increased in area. A graphical representation of a route is included in the combined view, wherein the graphical representation of the route summarizes one or more upcoming driving events which are associated with the portion of the map. The autonomous visualization includes the graphical depiction of the vehicle being in a particular lane of a plurality of lanes. Dynamically adjusting the combined view comprises: reducing a size of the combined view in the user interface, and adjusting the combined view to be in a first portion of the user interface. The icon user interface is in a second portion of the user interface, wherein the second portion does not occlude the first portion. The user interface: responds to user input directed to the icon user interface, wherein the user input causes adjustment of vehicle functionality associated with the selected icon; and dynamically adjusts the combined view to substantially encompass the user interface, wherein the icon user interface is removed from inclusion in the user interface. The icon user interface is associated with connecting a trailer to the vehicle. The icon user interface presents an indication of a measure of distance between the trailer and the vehicle, and wherein the icon user interface presents images or video obtained from image sensors about the vehicle. The autonomous visualization comprises a graphical depiction of the trailer. The user interface presents the icons on a side of the display proximate to a user selecting the icon.

Example embodiments may include methods, systems, and non-transitory computer storage media. An example non-transitory computer storage media stores instructions for execution by a system of one or more processors, the system being included in a vehicle, and the instructions causing the one or more processors to perform operations comprising: causing presentation, via a display of the vehicle, of a unified user interface comprising a combined view which aggregates an autonomous visualization, map information, and navigation information, wherein the combined view is associated with a zoom level indicating an area of a real-world environment reflected in the combined view, and wherein the vehicle is in a navigation mode associated with a destination; accessing sensor information from a plurality of sensors, wherein the sensor information comprises a location of the vehicle and images from image sensors positioned about the vehicle; and determining that the zoom level is to be adjusted based on the sensor information, wherein the combined view is updated to be associated with the adjusted zoom level.

The above embodiments may include one or more of the following. For the combined view, the autonomous visualization comprises: a graphical depiction of the vehicle, and a graphical representation of a real-world environment proximate to the vehicle, the graphical representation being generated based on the images from the image sensors, the map information comprises: a graphical representation of a portion of a map associated with the area of the real-world environment, and the navigation information comprises: one or more graphical representations of driving events which are associated with the area of the real-world environment. The graphical representation of the real-world environment depicts one or more lanes associated with a road on which the vehicle is driving, and wherein the graphical depiction of the vehicle is depicted in a particular lane of the one or more lanes. The particular lane is identified based on the images from the image sensors. Determining that the zoom level is to be adjusted based on the sensor information comprises: identifying, based on the navigation information, a particular number of driving events which are within a threshold distance or driving time of the location of the vehicle, wherein the determination is based on the particular number of driving events. Determining that the zoom is level is to be adjusted is based on one or more complexity measures associated with the particular number of driving events. Determining that the zoom is level is to be adjusted is based on the particular number of driving events exceeding a threshold. Determining that the zoom level is to be adjusted based on the sensor information comprises: identifying, based on the sensor information and navigation information, that an upcoming driving event is to be skipped, such that a route to the destination is updated; and adjusting the zoom level, wherein the combined view includes a graphical representation of the updated route. Identifying that the upcoming driving event is to be skipped is based on images from the image sensor, wherein the images are analyzed to identify a hazard associated with the upcoming driving event. Determining that the zoom level is to be adjusted based on the sensor information comprises: identifying, based on the sensor information and navigation information, that an upcoming driving event is of a particular type which is associated with adjusting the zoom level; and adjusting the zoom level, wherein the combined view includes a graphical representation of one or more driving events associated with the adjusted zoom level. The particular type comprises exiting a highway onto a surface road. The combined view is updated to depict a route associated with the adjusted zoom level.

Example embodiments may include methods, systems, and non-transitory computer storage media. An example method implemented by a system of one or more processors, the system in communication with one or more sensors positioned inside of a vehicle, comprises identifying presence of a passenger inside of the vehicle; determining, based on sensor information from the sensors, a portion of the passenger to be tracked; and controlling operation of vehicle functionality based on tracking of the portion of the passenger, wherein vehicle functionality comprises air conditioning control, mirror control and/or steering wheel positioning.

The above embodiments may include one or more of the following. Identifying the presence of the passenger is based on one or more images obtained from an image sensor facing within the vehicle. Identifying the presence of the passenger is based on a pressure sensor included in a seat of the vehicle. Identifying the presence of the passenger is based on detection of a user device used by the passenger, wherein the system is in wireless communication with the user device. Identifying the presence of the passenger is based on interruption of infrared emitters directed to a seat. Operations further comprise storing information usable to recognize the passenger, wherein the information is based on one or more images of a face of the passenger. The information comprises an encoded vector with respect to a learned vector space, the encoded vector being generated via a machine learning model. Operations further comprise generating a profile associated with the passenger, wherein the profile is associated with the information usable to recognize the passenger, and wherein the profile indicates preferences of the passenger with respect to operation of the vehicle functionality. Determining a portion of the passenger to be tracked is based on one or more images of the passenger from an image sensor facing within the vehicle. Controlling operation of the vehicle functionality comprises: adjusting a heating, ventilation, and air conditioning (HVAC) system, such that an output of air maintains direction to the portion of the passenger. Controlling operation of the vehicle functionality comprises: adjusting one or more mirrors based on the portion of the passenger, wherein the portion comprises eyes of the passenger. Operations further comprise the method further comprise causing output, via a display of the vehicle, of a user interface, wherein the user interface presents a recommendation indicating that the passenger adjust a position of the passenger's head.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure

What is claimed is:

1. A method implemented by a system of one or more processors, the system being included in a vehicle, and the method comprising:
   causing presentation, via a display of the vehicle, of a unified user interface comprising a combined view which aggregates an autonomous visualization and map information, the autonomous visualization and map information being associated with a zoom level, wherein the unified user interface is generated based on first contextual information indicative of operation of the vehicle;
   accessing second contextual information indicative of subsequent operation of the vehicle, wherein the first contextual information indicates that the vehicle is navigating along a route, wherein the combined view further aggregates navigation information, and wherein the second contextual information indicates that the vehicle has moved along the route; and
   updating the unified user interface based on the second contextual information, wherein the combined view is adjusted, and wherein adjusting the combined view comprises the zoom level,
   wherein the route is associated with a plurality of driving events comprising upcoming turns, off-ramps, and on-ramps indicated in the navigation information, and wherein the zoom level is adjusted according to the upcoming driving events,
   wherein the autonomous visualization includes a back portion of the vehicle, and wherein the system maintains the autonomous visualization of the back portion of the vehicle while there are less than a threshold number of upcoming driving events, and
   wherein based on the route indicating at least the threshold number of upcoming driving events, the combined view is updated to zoom-out,
   wherein the combined view includes:
      a graphical representation of one or more lanes of a road on which the vehicle is located,
      a graphical depiction of the vehicle positioned in a particular lane of the one or more lanes,
   and wherein based on a particular upcoming driving event of the threshold number of upcoming driving events indicating a lane change from the particular lane to an adjacent lane, the unified user interface is updated to:
      identify the adjacent lane and present an animation depicting the vehicle moving to the adjacent lane, and
      identify a different vehicle in the adjacent lane and include information indicating the vehicle is to wait until safe to change to the adjacent lane.

2. The method of claim 1, wherein the autonomous visualization includes a graphical representation of a real-world environment in which the vehicle is located.

3. The method of claim 2, wherein the graphical representation of the real-world environment comprises graphical depictions of other vehicles and graphical representations of one or more objects which are proximate to the vehicle.

4. The method of claim 1, wherein the combined view includes:
   map information comprising a graphical representation of a map associated with the road, wherein the graphical depiction of the vehicle is depicted as being on the map.

5. The method of claim 4, wherein the combined view represents a driving view, and wherein the graphical depiction of the vehicle is animated as driving in the particular lane.

6. The method of claim 1, wherein the method further comprises:
   receiving user input associated with updating the zoom level associated with the combined view;
   identifying a portion of the map information based on the updated zoom level; and
   updating the combined view, wherein the combined view includes a graphical representation of the portion of the map information.

7. The method of claim 1, wherein the autonomous visualization comprises a graphical depiction of the vehicle, and wherein the graphical depiction is reduced in size based on the adjusted zoom level.

8. The method of claim 1, wherein the unified user interface enables control of vehicle functionality, and wherein control of vehicle functionality comprises control of a heating, ventilation, and air conditioning system, or control of a music application, or control of a navigation user interface.

9. The method of claim 8, wherein the unified user interface includes a plurality of icons associated with respective vehicle functionality, wherein updating the unified user interface comprises:
   updating the unified user interface to include a menu associated with a selected icon, wherein the menu is included in a first portion of the unified user interface; and
   re-sizing the combined view, wherein the combined view is included in a second portion which is not occluded by the menu.

10. The method of claim 1, wherein a size of the autonomous visualization is adjusted based on the adjusted zoom level and wherein an area associated with the map information is adjusted based on the adjusted zoom level.

11. The method of claim 1, wherein the combined view illustrates a first driving event of the plurality of driving events, and wherein based on the combined view being zoomed out, the combined view illustrates a plurality of second driving events of the plurality of driving events.

12. The method of claim 1, wherein the unified user interface is responsive to user input causing adjustment of the zoom level or translation of the map information along a particular direction.

13. Non-transitory computer storage media storing instructions for execution by a system of one or more processors, the system being included in a vehicle, and the instructions causing the one or more processors to perform operations comprising:
   causing presentation, via a display of the vehicle, of a unified user interface comprising a combined view which aggregates an autonomous visualization, map information, and navigation information, wherein the combined view is associated with a zoom level indicating an area of a real-world environment reflected in the combined view, and wherein the vehicle is in a navigation mode associated with a destination;
   accessing sensor information from a plurality of sensors, wherein the sensor information comprises a location of the vehicle and images from image sensors positioned about the vehicle; and
   determining that the zoom level is to be adjusted based on the sensor information, wherein the combined view is updated to be associated with the adjusted zoom level, wherein the autonomous visualization includes a back portion of the vehicle, and wherein the system maintains the autonomous visualization of a back portion of the vehicle while there are less than a threshold number of upcoming driving events, and wherein based on the route indicating at least the threshold number of upcoming driving events the combined view is configured to zoom-out, wherein the combined view includes:
- a graphical representation of one or more lanes of a road on which the vehicle is located,
- a graphical depiction of the vehicle positioned in a particular lane of the one or more lanes, and wherein based on a particular upcoming driving event of the threshold number of upcoming driving events indicating a lane change from the particular lane to an adjacent lane, the unified user interface is updated to:
- identify the adjacent lane and present an animation depicting the vehicle moving to the adjacent lane, and
- identify a different vehicle in the adjacent lane and include information indicating the vehicle is to wait until safe to change to the adjacent lane.

14. The computer storage media of claim 13, wherein for the combined view, the autonomous visualization comprises:
- a graphical representation of a real-world environment proximate to the vehicle, the graphical representation being generated based on the images from the image sensors, the map information comprises:
- a graphical representation of a portion of a map associated with the area of the real-world environment, and the navigation information comprises:
- one or more graphical representations of the driving events which are associated with the area of the real-world environment.

* * * * *